United States Patent
Choi

(10) Patent No.: US 12,203,760 B2
(45) Date of Patent: Jan. 21, 2025

(54) CLOUD-BASED PLATFORM FOR DETERMINING AND GENERATING OPTIMIZED NAVIGATION INSTRUCTIONS FOR AUTONOMOUS VEHICLES

(71) Applicant: United Parcel Service of America, Inc., Atlanta, GA (US)

(72) Inventor: Youngjun Choi, Atlanta, GA (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 4 days.

(21) Appl. No.: 17/659,786

(22) Filed: Apr. 19, 2022

(65) Prior Publication Data

US 2022/0357167 A1    Nov. 10, 2022

Related U.S. Application Data

(60) Provisional application No. 63/185,740, filed on May 7, 2021.

(51) Int. Cl.
    *G01C 21/34*    (2006.01)
    *G01C 21/00*    (2006.01)
    *G01C 21/36*    (2006.01)

(52) U.S. Cl.
    CPC ..... *G01C 21/3446* (2013.01); *G01C 21/3617* (2013.01); *G01C 21/3841* (2020.08)

(58) Field of Classification Search
    CPC ............ G01C 21/3446; G01C 21/3617; G01C 21/3841; G01C 21/3484; G01C 21/3407
    See application file for complete search history.

(56) References Cited

U.S. PATENT DOCUMENTS

| 11,126,866 B2* | 9/2021 | Schubert ............ B60W 60/0011 |
| 11,768,079 B2* | 9/2023 | Galliano, III ...... G01C 21/3453 701/25 |
| 2018/0281191 A1* | 10/2018 | Sinyavskiy .......... G05D 1/0214 |

(Continued)

FOREIGN PATENT DOCUMENTS

WO    2019/055281 A2    3/2019

OTHER PUBLICATIONS

International Search Report and Written Opinion received for PCT Patent Application No. PCT/US2022/025472, mailed on Jul. 29, 2022, 14 pages.

(Continued)

*Primary Examiner* — Rami Khatib
*Assistant Examiner* — Gabriel Joseph Rene Lambert
(74) *Attorney, Agent, or Firm* — Shook, Hardy & Bacon L.L.P.

(57) ABSTRACT

Methods, systems, and computer-readable media are disclosed herein that generate computer-executable instructions that are executed by an autonomous vehicle and cause the autonomous vehicle to follow a specific route to deliver or pickup of an item. Using an inference model, historical data of off-street terrain used for prior deliveries and on-street terrain in map data are leveraged to generate candidate routes for the "last 10 feet" of a delivery. One of the candidate routes is selected by the inference model. Then, computer-executable instructions are generated that, when executed by an autonomous vehicle, cause the autonomous vehicle to follow the selected route and perform the last 10 feet of delivery.

20 Claims, 17 Drawing Sheets

(56) References Cited

U.S. PATENT DOCUMENTS

| | | | |
|---|---|---|---|
| 2019/0042859 A1* | 2/2019 | Schubert | B60W 60/0011 |
| 2019/0114564 A1* | 4/2019 | Ferguson | B64C 39/02 |
| 2020/0080865 A1* | 3/2020 | Ervin | G01C 21/3667 |
| 2020/0132488 A1* | 4/2020 | Slutskyy | G05B 13/021 |
| 2022/0018664 A1* | 1/2022 | Haney | G01C 21/3415 |
| 2022/0156680 A1* | 5/2022 | Tripathy | G06Q 10/047 |
| 2023/0152813 A1* | 5/2023 | Joseph | G01C 21/3691 |
| | | | 701/2 |

OTHER PUBLICATIONS

Choi et al., "Three-dimensional UAS Trajectory Optimization for Remote Sensing in an Irregular Terrain Environment", In 2018 International Conference on Unmanned Aircraft Systems (ICUAS), IEEE, Available online at: <https://ieeexplore.ieee.org/document/8453310>, Jun. 2018, pp. 1101-1108.

Ellis et al., "Modelling pedestrian trajectory patterns with gaussian processes", In 2009 IEEE 12th International Conference on Computer Vision Workshops, ICC Workshops, Available online at: <https://ieeexplore.ieee.org/document/5457470>, 2009, pp. 1229-1234.

Lee et al., "Kernel embedding-based state estimation for colored noise systems", In 2017 IEEE/AIAA 36th Digital Avionics Systems Conference (DASC), IEEE, Available online at: <https://ieeexplore.ieee.org/document/8102036>, Sep. 2017, pp. 1-8.

Rasmussen Carl E., "Gaussian processes in machine learning", In Summer School on Machine Learning, Springer, Berlin, Heidelberg, Available online at: <https://link.springer.com/chapter/10.1007/978-3-540-28650-9_4>, Feb. 2003, pp. 63-71.

* cited by examiner

CLOUD-BASED PLATFORM FOR DETERMINING AND GENERATING OPTIMIZED NAVIGATION INSTRUCTIONS FOR AUTONOMOUS VEHICLES

CROSS REFERENCE TO RELATED APPLICATION

This is a nonprovisional application that claims the benefit of and priority to U.S. provisional App. No. 63/185,740, filed on May 7, 2021 and entitled "CLOUD-BASED PLATFORM FOR DETERMINING AND GENERATING OPTIMIZED NAVIGATION INSTRUCTIONS FOR AUTONOMOUS VEHICLES", the entirety of which is incorporated by reference herein.

BACKGROUND

Unmanned vehicles have been be utilized to deliver or pickup items. However, unmanned vehicles require remote human intervention and control. Autonomous vehicles have not been utilized for door-stop delivery because such vehicles lack the knowledge to traverse off-street terrain.

SUMMARY

At a high level, aspects described herein relate to a cloud-based platform that collects data, trains an inference model, uses the trained inference model to generate possible routes to a target location based on the current location of an autonomous vehicle, selects an optimal route from the possible routes, and generates computer-executable instructions that, when communicated to an autonomous vehicle from the cloud-based platform, automatically cause the autonomous vehicle to travel from the current location to the target location. Various related methods, including methods of use, among others, are also described. More specifically, various aspects herein provides for a cloud-based autonomous vehicle delivery route generation platform that ingest historical travel information from tracked movement of delivery vehicles and/or from delivery personnel. The platform can generate a highly-precise delivery route or trajectory from an initial dispatching location to a service location (e.g., package delivery or pick-up), which is provided to and executed by an autonomous vehicle for traversing "on-street" and/or "off-street" terrain, particularly for targeting the "last 10 feet" of a delivery or pickup task.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

Embodiments are described in detail below with reference to the attached drawings figures, wherein.

DETAILED DESCRIPTION

Figure 1:
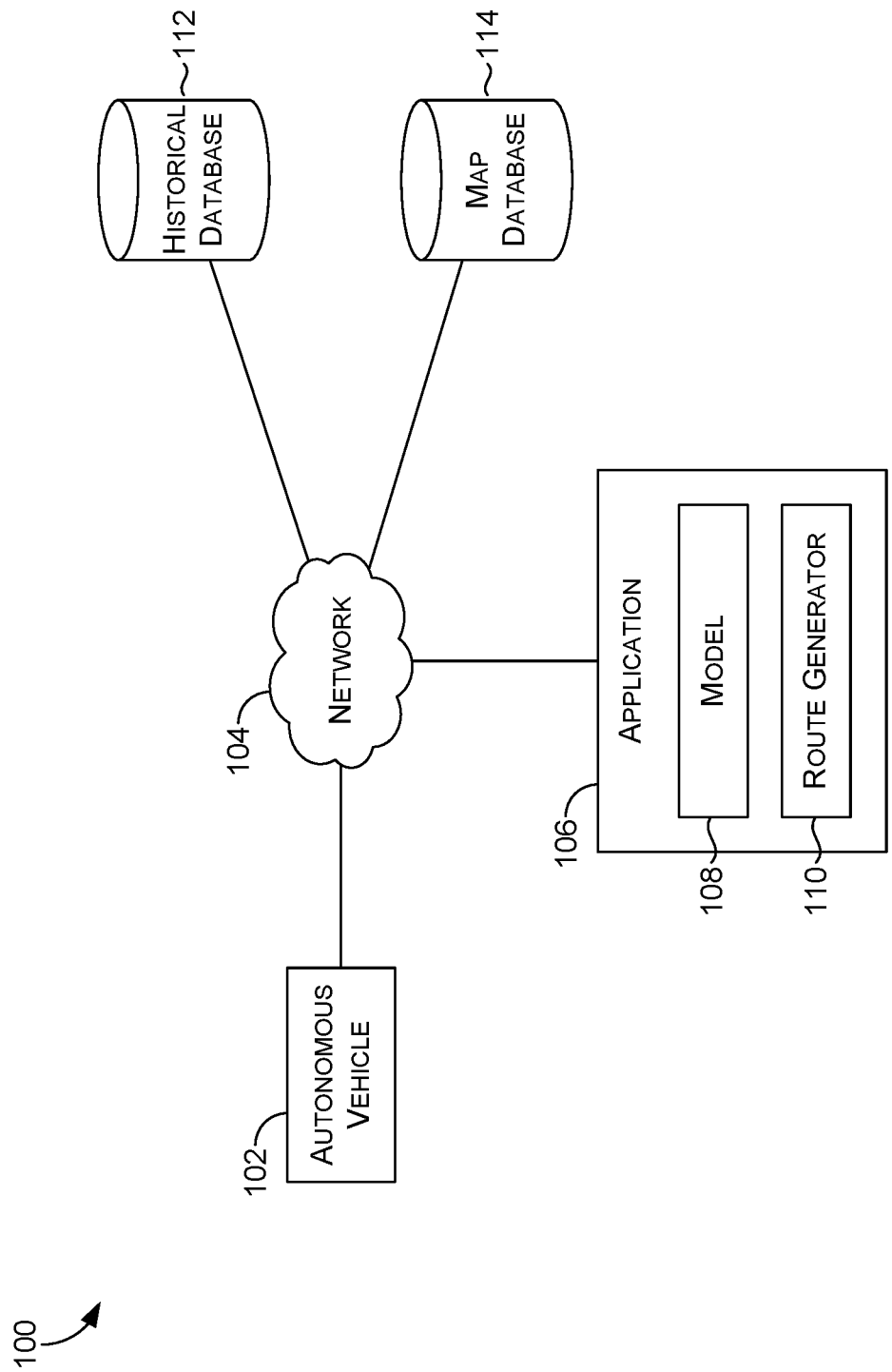
FIG. 1 is a diagram of an example environment having a system that is suitable for implementation of aspects of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In aspects herein, an autonomous vehicle can be dispatched from a delivery vehicle anywhere along a street proximate a delivery or pickup location. The autonomous vehicle can travel using automatically generated navigation instructions from the delivery vehicle down a street or sidewalk, up a driveway or the like, to reach a specific area at the delivery or pickup location, such as a front door, door stoop, garage door, and the like, where a parcel can be left or picked up. As such, an autonomous vehicle can make door-to-door deliveries without any human interaction, human direction, or manual controls of any kind, even when the autonomous vehicle is dispatched from any number of various locations along a street proximate a delivery or pickup location, for example. As such, embodiments herein can be performed completely and in whole without requiring direct or remote manual control by a person, and with without requiring or prompting any human intervention or action.

Other technologies are unable to navigate autonomous vehicles over "off-street" terrain without requiring human interaction, human remote monitoring, and/or manual controls. For example, other technologies are unable to perform the "last 10 feet" of delivery routes over sidewalks and driveways, which correspond to off-street terrain. It will be understood that the phrase "last 10 feet" is only an example and is not limiting in terms of distance nor the scale of distance. Rather, the phrase refers to any distance or scale of distance between on-street terrain location(s) and a drop-off or pick-up location, e.g., the last 10 feet correspond to the physical distance between a delivery vehicle and a front door, lobby, step, stoop, or drop-off box/locker that is the final "gap" in delivery and pick-up. In some aspects, the phrase refers to an off-street terrain portion that is not/cannot be traversed by a conventional or traditional delivery vehicle (e.g., sidewalks, driveways, bike lanes, foot pathways, stairs, and other) to reach the final physical place a package in a delivery location. In other words, the last 10 feet of a delivery or a pick-up is traditionally manually walked by delivery personnel carrying a package, for example, from a delivery vehicle to a front door. Other technologies cannot or do not fully automate the last 10 feet of delivery at least in part because of limited publically-available data regarding these areas. Other technologies rely wholly on real-time sensor-based data during travel, for example, using optical sensors or proximity sensors to provide a remotely-located human with visual information that could then be used by the remotely-located human to "steer" the autonomous vehicle over on-street terrain or off-street terrain. Also, other technologies are unable to fully automate (i.e., without requiring human interaction, human remote monitoring, or manual controls) delivery or pick-up of a package with significant precision using a terrain-based autonomous vehicle. For example, other technologies rely wholly on real-time sensor-based data during travel, for example, using optical sensors or proximity sensors with computer algorithms to recognize a house or building. Once recognized, other technologies again resort to using real-time optical sensors to attempt to locate delivery location, such as a door.

Drawbacks of other technologies include a heavy reliance on real-time sensor data during transport, as sensors can break, fail, or malfunction rendering any autonomous vehicle unable to navigate at all. Additionally, other technologies' reliance on real-time sensor data requires significant processing during transport—in other words, the autonomous vehicle has to process sensor data in real-time with data capture (assuming the autonomous vehicle is able to), leaving little or no room for error. As such, a slight miscalibration of a sensor or interference with sensors by common weather phenomenon (e.g., rain accumulation on a lens or fog causing low visibility) can greatly impair an autonomous vehicle's ability to navigate when only real-time sensor data is being used to travel. Further, processing sensor data in real-time with data capture requires significant processing and computing resources at the autonomous vehicle, which is turn can overload processing capacity and even drain a power supply of an autonomous vehicle. On top of these technological problems, limitations, and drawbacks, real-time sensing dependent technologies such as these are such that the sensors have difficulty recognizing off-street delivery locations, as well as a current location in relation to that off-street delivery location, which causes non-negligible negative impacts and delays to delivery and/or pickup actions.

As such, aspects herein overcome the technological limitations of other technologies and solve the technological problems of other technologies, discussed above. Aspects herein overcome the technological problems created when autonomous vehicles rely heavily or completely on real-time sensor data by, via the aspects herein, leveraging a cloud-based platform having a machine learning model in combination with segmentation techniques to generate optimized navigation instructions for an autonomous vehicle, all without requiring and/or without utilizing real-time sensor data beyond the current location of an autonomous vehicle. Aspects herein further provide technological improvements surmounting the technological limitations that previously prevented truly autonomous navigation, as aspects herein benefit from the cloud-based machine learning model built with and trained using historical data that is not readily available (e.g., data for "off-street" areas such as sidewalks, bike lanes, and driveways). Additional technological improvements include increased accuracy of the navigation instructions provided to autonomous vehicles for traveling along a time-and-distance optimized route, generated and selected by the cloud-based platform, thereby overcoming the limitations that previously could only be solved by relying on human interaction, human remote monitoring, or manual control. It will be understood that while the discussion herein involves delivery or pick-up of items, the aspects herein can be implemented in other scenarios facing similar technological problems/limitations. As such, other non-delivery scenarios are contemplated to be within the scope of this disclosure. Further, the user of the terms "delivery" and "pick-up" are used interchangeably and are not intended to limit any examples to one or the other when used alone.

At a high level, aspects herein provide a cloud-based platform that collects data, trains an inference model, uses the trained inference model to generate possible routes to a target location based on the current location of an autonomous vehicle, selects an optimal route from the possible routes, and generates computer-executable instructions that, when communicated to an autonomous vehicle from the cloud-based platform, automatically cause the autonomous vehicle to travel from the current location to the target location. Generally, historical data is collected for prior travel, whether by vehicle, autonomous vehicle, or personnel, for example. The historical data may include prior travel for delivery or pick-up of items to any number of geographic locations that may be associated with a street address, a business address, an apartment building, and the like. The historical data can include, in some aspects, time-series data such as the combination of a latitude, a longitude, and a time when the latitude and longitude were recorded, for example. The historical data may be stored in a database that can be accessed, queried, and/or updated by the cloud-based platform, in aspects. In some aspects, the historical database is cloud-based as well.

The cloud-based platform uses the historical data to train a prediction or inference model. For example, the cloud-based platform can train a two-dimensional Gaussian Process model using time-series data such as a latitude, a longitude, and a time when the latitude and longitude were recorded. It will understood that, while Gaussian Process models are discussed herein, this is just one example as one or more other time-series machine learning methods may be used alone in combination with the Gaussian Process technique herein. In such an example, when a current location of an autonomous vehicle and a target location (e.g., for delivery or pick-up) are input to the trained prediction model, the trained prediction model can generate route portions to connect, at least partially, the current location of the autonomous vehicle and the target location. In the example, the cloud-based platform also performs segmentation on road data based on the current location of the autonomous vehicle and the target location in order to generate route portions to connect, at least partially, the current location of the autonomous vehicle and the target location. By combining various route portions (i.e., output from the prediction model and output from the segmentation), the cloud-based platform generates multiple routes (e.g., potentially-traversable and/or previously-traversed) that connect the current location of the autonomous vehicle and the target location, in such an example. The cloud-based platform can further select one of the multiple routes as optimal, generate navigation instructions for that one route, and communicate the navigation instructions to the autonomous vehicle for performance, wherein the autonomous vehicle executes the instructions and is caused to traverse the one optimal route—without human oversight and/or intervention, and without any need or requirement to capture and process sensor data in real-time. While routes are generally discussed herein with regards to outdoor terrain, it will be understood from this Detailed Description that indoor route planning is contemplated to be within the scope of the embodiments herein.

In one embodiment, one more non-transitory computer-readable media are provided having computer-executable instructions embodied thereon that, when executed, perform a method. In such an embodiment, a first point is identified that is a current location of an autonomous vehicle for delivery or pick-up of an item. A second point is also identified that is a drop-off or pick-up location of the item. A first set of data is generated based on historical drop-off or pick-up data associated with the second point and a second set of data is generated based on map data associated with the second point. Based on the first set of data and the second set of data, navigation instructions are generated for a route from the first point to the second point. In embodiments, the navigation instructions are communicated to an autonomous vehicle, wherein execution of the navigation instructions cause the autonomous vehicle to travel from the first point to the second point.

In another embodiment, one or more non-transitory computer-readable media having computer-executable instructions embodied thereon that, when executed, perform a method. In an embodiments, a first point that is a current location of an autonomous vehicle for delivery or pick-up of an item is identified and a second point that is a drop-off or pick-up location of the item is identified. In such an embodiment, a first set of data is generated based on historical drop-off or pick-up data associated with the second point, wherein the first set of data includes a first plurality of route portions from the second point to a plurality of intermediate points. Further, a second set of data is generated based on map data associated with the second point, wherein the second set of data includes a second plurality of route portions from the first point to the plurality of intermediate points. In embodiments, a plurality of routes is generated from combinations of the first plurality of route portions of the first set of data and the second plurality of route portions of the second set of data, wherein the plurality of routes connect the first point to the second point using at least one of the plurality of intermediate points. A primary route is selected from the plurality of routes and navigation instructions for the primary route are generated. In such embodiments, the navigation instructions are communicated to an autonomous vehicle, wherein execution of the navigation instructions cause the autonomous vehicle to travel from the first point to the second point.

In yet another embodiment, a system is provided. The system includes a cloud-based platform having a machine-learning Gaussian data model trained using historical data drop-off or pick-up data and a route generator. The cloud-based platform can identify a first point that is a current location of an autonomous vehicle for delivery or pick-up of an item and can identify a second point that is a drop-off or pick-up location of the item. The machine-learning Gaussian data model generates a first set of data based on historical drop-off or pick-up data associated with the second point, wherein the first set of data includes a first plurality of route portions from the second point to a plurality of intermediate points, in embodiments. The route generator, in some embodiments, generates a second set of data based on map data associated with the second point, wherein the second set of data includes a second plurality of route portions from the first point to the plurality of intermediate points. A plurality of routes are generated from combinations of the first plurality of route portions of the first set of data and the second plurality of route portions of the second set of data, wherein the plurality of routes connect the first point to the second point using at least one of the plurality of intermediate points. Then, in embodiments, a primary route is selected from the plurality of routes by the route generator. The cloud-based platform generates navigation instructions for the primary route and communicates the navigation instructions to an autonomous vehicle, wherein execution of the navigation instructions cause the autonomous vehicle to travel from the first point to the second point.

Definitions

The term "autonomous vehicle" refers to a vehicle that can travel without requiring direct or manual real-time human-control.

The term "point" refers a geographic location defined by specific coordinates, such as latitude and longitude coordinates or by coordinates captured by a positioning system. Examples of positioning systems that can define specific coordinates for a geographic location "point" includes a Global Positioning System (GPS); Globalnaya Navigazionnaya Sputnikovaya Sistema (GLONASS); BeiDou Navigation Satellite System (BDS); Global Navigation Satellite System (GNSS or "Galileo"); Low Earth Orbit (LEO) satellite systems; Department of Defense (DOD) satellite systems; the Chinese Compass navigation systems; Indian Regional Navigational satellite systems; and the like. Additionally, other systems may be used with the prior systems or alone, for example, an indoor position system (IPS); signals opportunity (SOP); triangulation via telecommunications systems (e.g., LTE, 5G); or the like. In the context discussed herein, a point can refer to a geographic location of, for example, a drop-off location for an item, a pick-up location for an item, an intermediate location within a route or portion of a route, a dispatch location for a vehicle and/or autonomous vehicle, a dispatch location for personnel, a location for beginning or initiating a route or a portion or a route, a location for ending or terminating a route or portion of a route, and a parking location of a vehicle. The coordinates for a "point" can be described in various ways, including, for example, Decimal Degrees (DD); Degrees, Minutes, Seconds (DMS); Universal Transverse Mercator (UTM); and Universal Polar Stereographic (UPS) coordinate systems.

The term "navigation instructions" refers to computer-executable instructions that define provide a plurality of points and a sequence of that plurality of points that together form a path, route, or portion of a route that can be traveled by a vehicle and/or autonomous vehicle. The vehicle and/or autonomous vehicle can ingest the navigation instructions and responsively, without human interaction or human input, and without manual interaction or manual input, can travel by following the sequence of that plurality of points that together form a path, route, or portion of a route based on the vehicle's and/or autonomous vehicle's current location relative to said points and sequence.

The term "route" refers to a defined traversable path having a geographic starting point (e.g., a dispatch location of an autonomous vehicle), a geographic ending point (e.g., a drop-off or pick-up location of a parcel), and one or more sequential geographic points that connect the geographic starting point to the geographic ending point, in order to form a "continuous" path. The route can include on-street terrain, off-street terrain, and any combination thereof.

The term historic data can generally refers to time-series data previously captured in real-time by a device, for example, during performance of a particular portion of a route for a prior drop-off or pick-up of a parcel. For example, such time-series data could include a plurality of triplets of data that specify concurrently recorded a latitude coordinate, a longitude coordinate, and time when the particular latitude and longitude coordinates were measured by the device. The time-series data may correspond to one or more waypoints that together to form a path or route comprised of route portions or sub-routes, each triplet indicating a location of the device at a distinct point in time while that device was physically traveling during a prior drop-off or pick-up of a parcel.

The term "map data" generally refers to data associated with, corresponding to, and/or representing a plurality of geographic locations, physical locations, and/or addresses, for example. The map data may correspond to aerial-views of highways, streets, roads, and the like within a defined geographic region, for example, such that map data is associated with or corresponds to "on-street terrain."

The term "first point" generally refers to a current or present location of an autonomous vehicle, in aspects. The first point may be represented with GPS coordinates or other satellite positioning coordinates, in some aspects. The first point can be identified via and/or provided by the autonomous vehicle. The first may generally correspond to or can overlap with highways, streets, or roads found in the map data. The term "second point" generally refers to delivery point (e.g., a door step for pick-up or delivery of a parcel) that is identified autonomously by the systems, methods, and media herein using the historical data. In aspects, the second point generally corresponds to "off-street" terrain. The term "intermediate point" generally refers to one or more waypoints having a physical location between the first point and the second point, wherein the intermediate waypoints correspond to points wherein the historical data and the map data border one another. As such, intermediate point(s) form a boundary where the on-street terrain meets the off-street terrain based on the map data and the historical data. As used herein, numerical or sequential terms "initial," "first," "second," "third," "intermediate", "last," "terminal" and so on are merely herein used for clarity in the discussion when distinguishing various points from one another and are not used to imply or require a particular sequence, order, relevance, or importance unless or only when expressly stated.

The term "flow graph" generally refers a graphic for mathematically-representing directional vectors generated from data, as further discussed herein. Although a flow graph is utilized in the discussion and the figures, other graphic and non-graphic depictions for quantifying historical data for input and use by inference models are contemplated for use with aspects herein, and such graphic and non-graphic depictions are within the scope of this disclosure.

Embodiments

Beginning with FIG. 1, an environment 100 for example environment having a system that is suitable for implementation of aspects of the present invention. It will be understood by those of ordinary skill in the art that the environment is just one example of a suitable environment for implementing systems, media, and methods described herein that is not intended to limit the scope of use or functionality of the present invention. The example environment is simplified to illustrate devices, components, and modules in merely one of many suitable configurations and arrangements, such that configurations and arrangements of devices, components, and modules relative to one another, as well as the and the quantity of each of the devices, components, and modules, can vary from what is depicted (e.g., devices, components, and modules may be omitted and/or could be greater in quantity than shown). As such, the absence of components from FIG. 1 should be not be interpreted as limiting the present invention to exclude additional components and combination(s) of components. Similarly, the computing environment 100 should not be interpreted as imputing any dependency between devices, components, and modules, and nor imputing any requirements with regard to each of the devices, components, modules, and combination(s) of such, as illustrated in FIG. 1. Also, it will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake.

The environment includes a system or platform having an autonomous vehicle 102 that communication with an application 106, which are enabled to communicate through a network 104. In various aspects, the system or platform is cloud-based. The network 104 may include one or more wireless networks, hardwired networks, telecommunications networks, peer-to-peer networks distributed networks, or any combination thereof. Example networks include telecommunications network (e.g., 3G, 4G, 5G, CDMA, CDMA 1XA, GPRS, EvDO, TDMA, GSM, LTE, and/or LTE Advanced). Additional example networks include a wide area network (WAN), local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network.

The environment 100 includes a system or platform that hosts and runs an application 106. The application 106 operates to generate computer-executable instructions for that, when executed by a processor of the autonomous vehicle 102, for example, cause the autonomous vehicle to navigate from one point to another point, using a particular defined route comprised of route portions that are identified and selected by the application 106. As such, the application 106 can operate to control the navigation of a fleet of autonomous vehicles at times of dispatch for the delivery and/or pick-up of items, at a global scale. For example, the application can communicate, using the current location (e.g., GPS coordinates) of each autonomous vehicle and a delivery or pick-up location (e.g., a street address), detailed navigation instructions to each of the autonomous vehicles that are specific to each particular geographic location for the delivery and/or pick-up of items.

The application includes a model 108. In aspects, the model 108 is a data model that can be computer generated and computer trained with data, by way of machine-learning techniques. As such, the model 108 can be a machine-learning model that, when trained, can output a plurality of route portions based on historical data, as discussed in detail hereinafter. In various aspects, the model may be parametric or non-parametric in nature. In some aspects, the model 108 can be a non-parametric model, such as a Gaussian Process ("GP") data model or a Gaussian Process Regression ("GPR") data model. In one example, the model 108 can be a two-dimensional Gaussian Process data model. Although the model 108 is discussed hereinafter in terms of a Gaussian Process, it will be understood that other types of data models that can be used as an alternative or substitute to produce similar results as a Gaussian Process are contemplated to be within the scope of this disclosure and the aspects discussed herein.

The model 108 may access and query a historical database 112 that stores historical drop-off or pick-up data for a plurality of geographic locations, for example, for training, re-training, and for outputting one or more route portions that can be utilized by the application to generate navigation instructions. The historical data in the historical database 112 may correspond to geographic coordinates previously captured in real-time by a device during a prior drop-off or pick-up of a parcel, for example. In one example, the historical data can include GPS data. The historical data may include time-series data previously captured in real-time by a device during a prior drop-off or pick-up of a parcel. For example, time-series data can include a plurality of triplets of data that specify concurrently recorded a latitude coordinate, a longitude coordinate, and time when the particular latitude and longitude coordinates were measured by the device. In this example, the plurality of triplets provide "digital breadcrumbs" or waypoints that together to form a path or route comprised of route portions or sub-routes, each triplet indicating a location of the device at a distinct point in time while that device was physically traveling during a prior drop-off or pick-up of a parcel. The digital breadcrumbs provide multiple points that can be connected to formulate a traversed path, whether linear or non-linear in nature. As such, historical data in the historical database 112 can include millions of route portions formed from time-series data for any quantity of routes and/or route portions that have been previously traversed and recorded via any quantity of devices. Further, the historical data may store multiple route portions for one geographic location together, in association. As such, for a particular location (e.g., address), historical data may be stored in association with several route portions that were used for a delivery or pickup at that particular location. In this manner, each location of a plurality may be associated with corresponding historical data for that particular location in the historical database 112. In one example, each distinct street address in the city of Chicago may be stored in association with historical data that corresponds to delivery and/or pick-ups to that particular street address, such that data can be structured as subsets of address-specific historical data. The historical data of the historical database 112 can be provided to and ingested by the model 108, wherein the model can identify and/or generate a first plurality of route portions that are associated with a particular geographic location for the drop-off or pick-up of a parcel.

The route generator 110 of the application 106 may be a computer module configured to generate multiple routes and/or route portions as well as detailed navigation instructions based on output from the model 108 and map data. As such, the route generator 110 receives information from the model 108, such as the first plurality of route portions that are associated with the particular geographic location for the drop-off or pick-up of a parcel. Additionally, the route generator 110 accesses and queries a map database 114 that stores map data for a plurality of geographic locations. For example, the map data may correspond to aerial-views of highways and roads in defined geographic regions. The route generator 110 may leverage one or more segmentation techniques against the map data to identify one or more intermediate point where a highway or road meet or overlaps with one or more of the route portions output by the model 108 for a particular location. The map data generally stores data for off-street terrain such as sidewalks, bike lanes, and more, as previously described. The route generator 110 may generate multiple route portions from a current location (e.g., a dispatch location of the 102 autonomous vehicle) to the intermediate point(s). As further discussed in detail below, the route generator 110 proceeds to combine one or more of the route portions from the current location to one or more of the intermediate point(s) with one or more of the route portions from the model 108 that connect the intermediate point(s) to the final location—which produces a "complete" route for navigating from the current location to the final location. The route generator 110 can further select a route and generate navigation instructions that, when executed, cause the autonomous vehicle 102 to travel via the route for delivery or pick-up of an item at a particular location. The navigation instructions can be communicated from the application 106 to the autonomous vehicle 102 wirelessly, for example, via the network 104.

Figure 2:
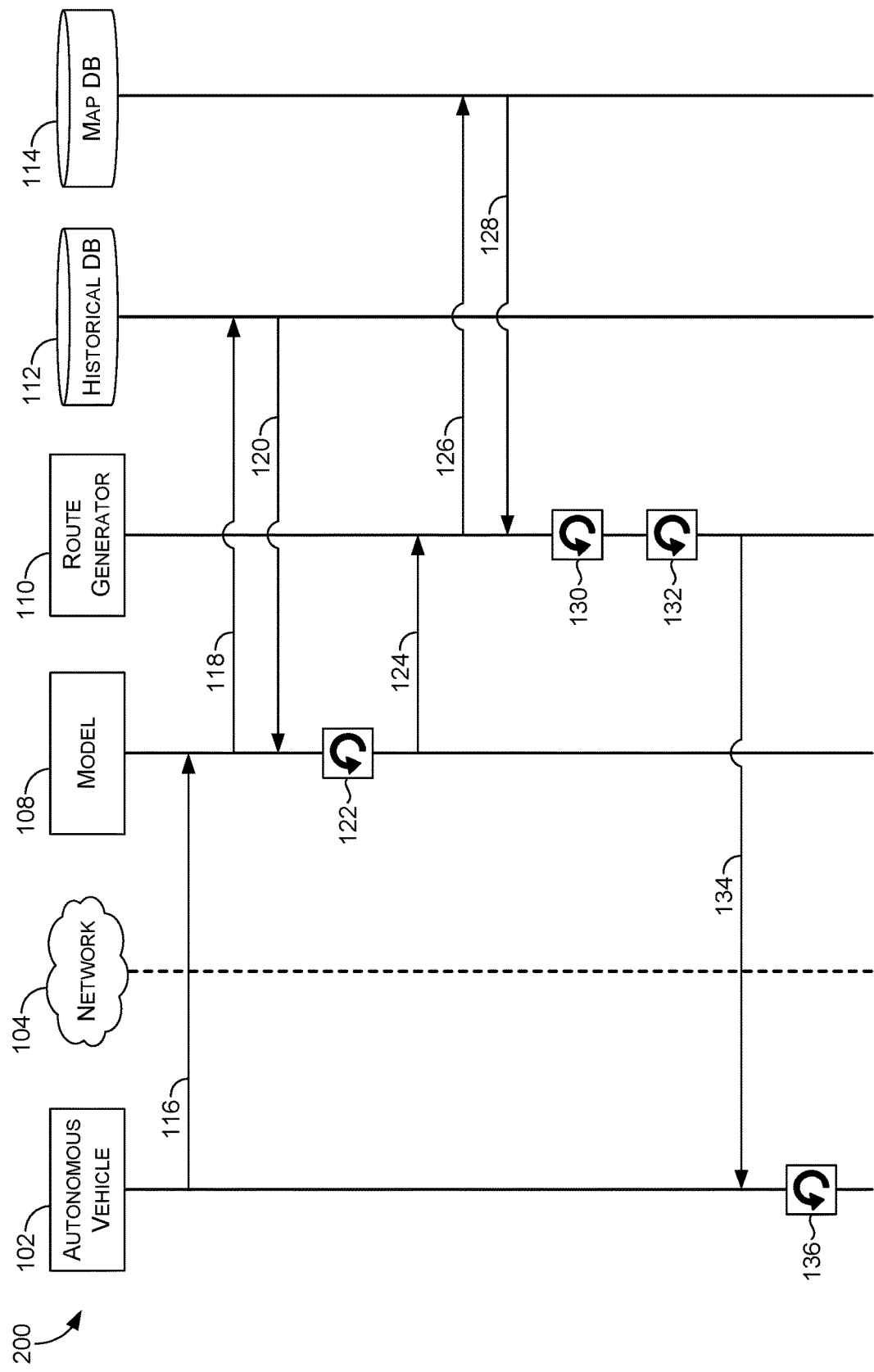
FIG. 2 is a flow diagram of communications for the system and components of FIG. 1 in accordance with aspects of the present invention.

For example, continuing to FIG. 2, a flow diagram is shown regarding an example of interactions or communications involving the system, components, and environment 100 shown in FIG. 1. As shown in the flow diagram, using minimal input information, a route can be generated through a combination of a machine learning model and segmentation techniques in order to cause an autonomous vehicle to travel in accordance with the route. In FIG. 2, the autonomous vehicle 102 communicates 116 a first point and a delivery location point to the cloud-based platform, via the network 104. The first point is a current location of the autonomous vehicle, in aspects. The delivery location is an address for the drop-off or pick-up location of an item, in some aspects. In various aspects, the first point and/or the delivery location can be communicated by another delivery vehicle, mobile, device, server, or combination thereof, for example, to the cloud-based platform. In aspects, the delivery location is ingested into the model 108. The model 108 communicates 118 the delivery location to the historical database 112, wherein the delivery location acts as a query that locates historical data that is associated with the delivery location. For example, the delivery location is utilized to search for time-series data of one or more previous deliveries or pick-ups made to the delivery location, such that the delivery location (e.g., a street address) acts as a query to locate a record of historical data that corresponds to the delivery location and from which a second point (e.g., time-series data of off-street coordinates) can be identified. In response to communicating the delivery location to the historical database 112, the historical data that is associated with and/or that specifically corresponds to the delivery location is communicated 120 from the historical database to the model 108 in the cloud-based platform. The model 108 can identify the second point within the historical data, for example, for the delivery location.

The model 108 generates 122 a first set of data based on the historical drop-off or pick-up data associated with the second point. The first set of data can be one or more route portions output as predictions from the model 108 based on the historical drop-off or pick-up data associated with the second point. The one or more route portions may correspond to "off-street" data that include a delivery point (e.g., a door step) associated with a second point. The model 108 can communicate 124 the first set of data to the route generator 110. Based on the first point and second point communicated (i.e., 116) to the cloud-based platform, the route generator 110 communicates 126 the first point and the second point to the map database 114, wherein the first point acts as a query that locates map data that is associated with the first point. For example, the first point and the second point are utilized to search for corresponding map data (e.g., roads, highways), such that the first point (e.g., a GPS point describing the current location of the autonomous vehicle 102) and the second point (e.g., a street address) act as queries to locate map data that corresponds to the first point, the second point, and/or map data proximate to the first point and the second point. As such, map data that corresponds to the current location of the autonomous vehicle, map data that corresponds to the delivery or pickup location, and map data that corresponds to areas connect the first points and the second point, for example, by roads or highways, is searched for, identified, and returned as a result to the query. Accordingly, in response to communicating the first and second points to the map database 114, corresponding map data is communicated 128 from the map database 114 to the route generator 110 in the cloud-based platform.

The route generator 110 uses the map data to generate 130 a second set of data. The second set of data can be one or more route portions that connect the first point to an intermediate point associated with the second point, in some aspects. For example, the second set of data can be one or more route portions connecting first point that is the current location of an autonomous vehicle to the second location, but these one or more route portions may correspond to "on street" data unlike the one or more route portions of "off-street" data from the model 108. Based on the first set of data and the second set of data, the cloud-based platform generates 132 at least one complete route that connects the first point to a delivery location at the second point. The at least one complete route comprise one of the portions in the first set of data and one of the portion in the second set of data, for example, which are connected at an intermediate point. Further, navigation instructions are generated by the cloud-based platform for a particular route from the first point to the second point selected by the cloud-based platform for implementation and use. The navigation instructions are communicated 134 to an autonomous vehicle, wherein execution 136 of the navigation instructions cause the autonomous vehicle to travel from the first point to the second point.

Figure 3:
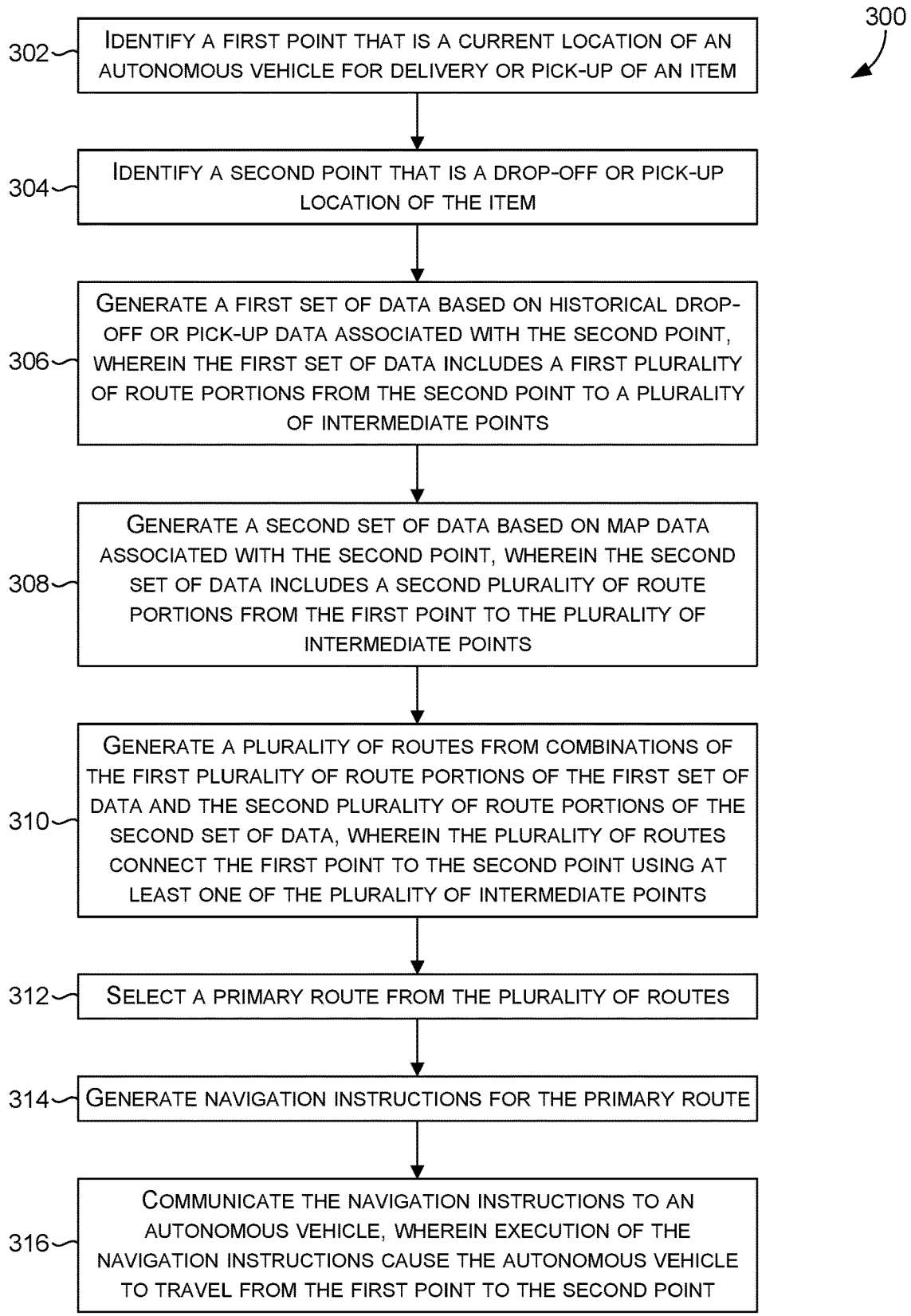
FIG. 3 is a flowchart of a method in accordance with aspects of the present invention.

Turning now to FIG. 3, a flowchart of a method 300 is provided for determining and generating optimized navigation instructions for autonomous vehicles. In some embodiments, the method 300 can be a computer-implemented method. In one embodiment, one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 300, can specify a sequence of steps of the method 300, and/or can identify particular component(s) of software and/or hardware for performing one or more of the steps of the method 300, in embodiments. The computer-readable instructions or computer-readable program code portions can correspond to an application and/or an application programming interface (API), in some embodiments. In one embodiment, the application or API can implement and/or perform the method 300. As discussed below, the method 300 can be performed using software, hardware, component(s), and/or device(s) depicted in FIGS. 1 and 2. For example, one or more steps of the method 300 can be performed by a cloud-based and/or remotely-run computerized application that communicates with an autonomous vehicle using a network.

At block 302, a first point is identified that is a current location of an autonomous vehicle for delivery or pick-up of an item. The first point corresponds to a current dispatch location of the autonomous vehicle that is to perform delivery or pick-up of an item, for example. The first point can be identified based on the cloud platform, a component thereof, or a communicatively connected component thereof, wirelessly receiving an indication of the current location from the autonomous vehicle or another vehicle from which the autonomous vehicle is dispatched. At block 304, a second point that is a drop-off or pick-up location of the item is identified. The second point can be identified based on the cloud platform, a component thereof, or a communicatively connected component thereof, receiving an indication of an address for the drop-off or pick-up location. In some aspects, the second point is identified by using a clustering-type algorithm on the historical data to identify a predicted service point that corresponds to a high-granularity drop-off or pick-up location, e.g., specific longitude and latitude, a single GPS point. Although discussed in sequence here, it should be understood that the first and second point can be identified in any sequence, simultaneously, or concurrently.

Figure 4:
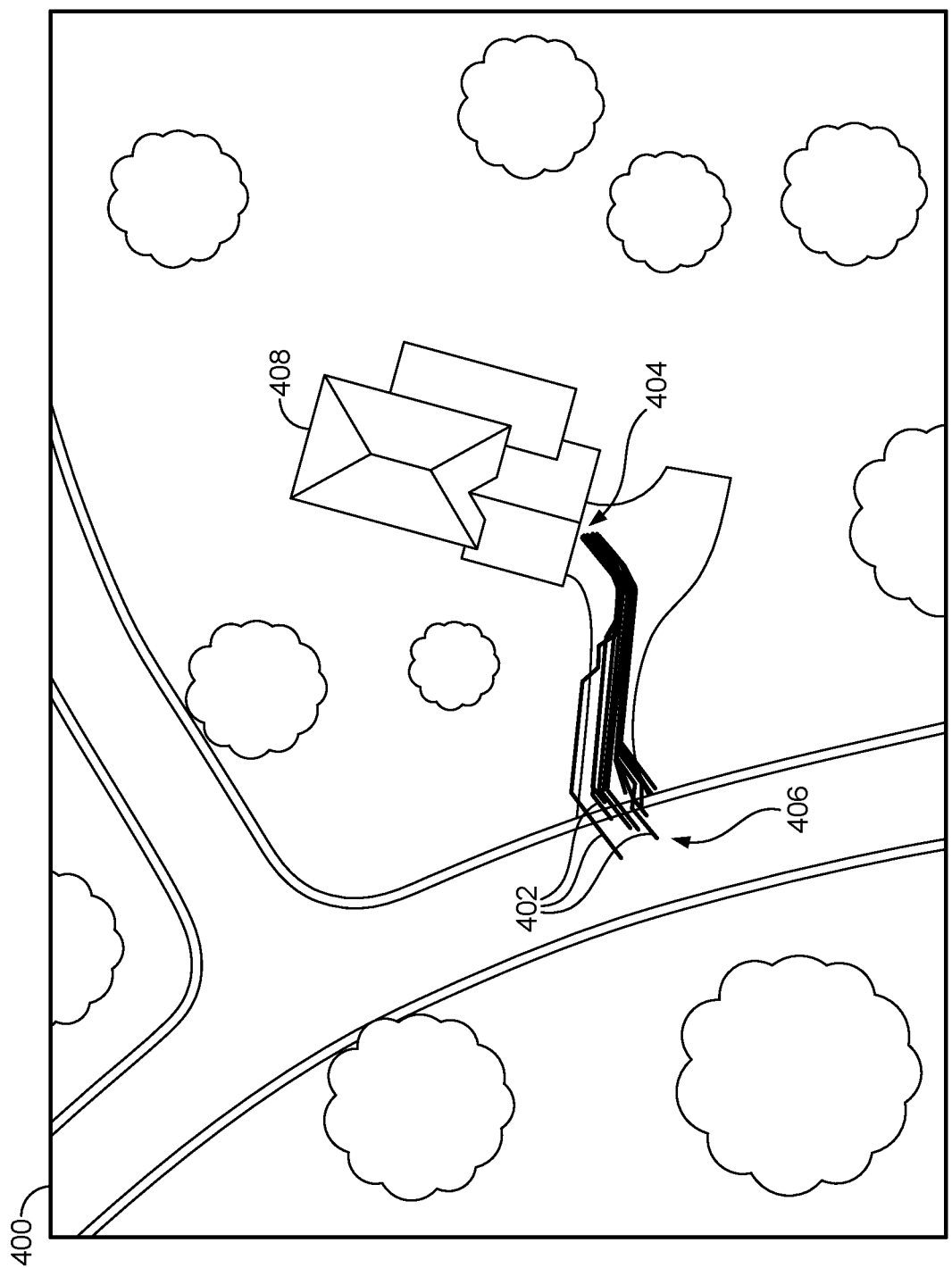
FIG. 4 depicts an example aerial view of an area of interest in accordance with aspects of the present invention.

At block 306 a first set of data is generated based on historical drop-off or pick-up data associated with the second point, wherein the first set of data includes a first plurality of route portions from the second point to a plurality of intermediate points. For example, FIG. 4 depicts an example aerial view 400 of an area of interest having a first plurality of route portions shown as lines 402 that general traverse the geographic area between the second point 404 (e.g., a delivery point such as a residence, shown as a home 406) and an intermediate point 408. As a delivery vehicle may have parked or idled at different locations on the street shown for different previous deliveries to the address, the beginning of each of the route portions varies to some degree such that the intermediate point 408 acts as an approximation. The aerial view has been is simplified and stylized for simplicity of the illustration.

The first set of data can be generated by the inference model, such as model 108 of FIGS. 1 and 2, in some aspects, by generating a flow graph from the historical drop-off or pick-up data associated with the second point using an inference model. In such aspects, the inference model can be a two-dimensional Gaussian model, for example. In one example, a two-dimensional Gaussian model may be expressed as:

$$f \sim GP(\mu(x), k(x,x'))$$

where $\mu(x)$ is a mean function representing mean states over all of the routes, and where $k(x, x')$ is a covariance function for providing a level of uncertainty. The Gaussian model can, for example, utilize time series data such as GPS coordinates or other digital breadcrumbs captured by a mobile device making a prior visit to the second point to predict a plurality of route portions. In some aspects, the flow graph that is generated using the historical drop-off or pick-up data is further manipulated or honed by applying an attractive force to the second point that was identified from the historical data via clustering, by applying an uncertainly constraint, or a combination thereof.

Figure 5:
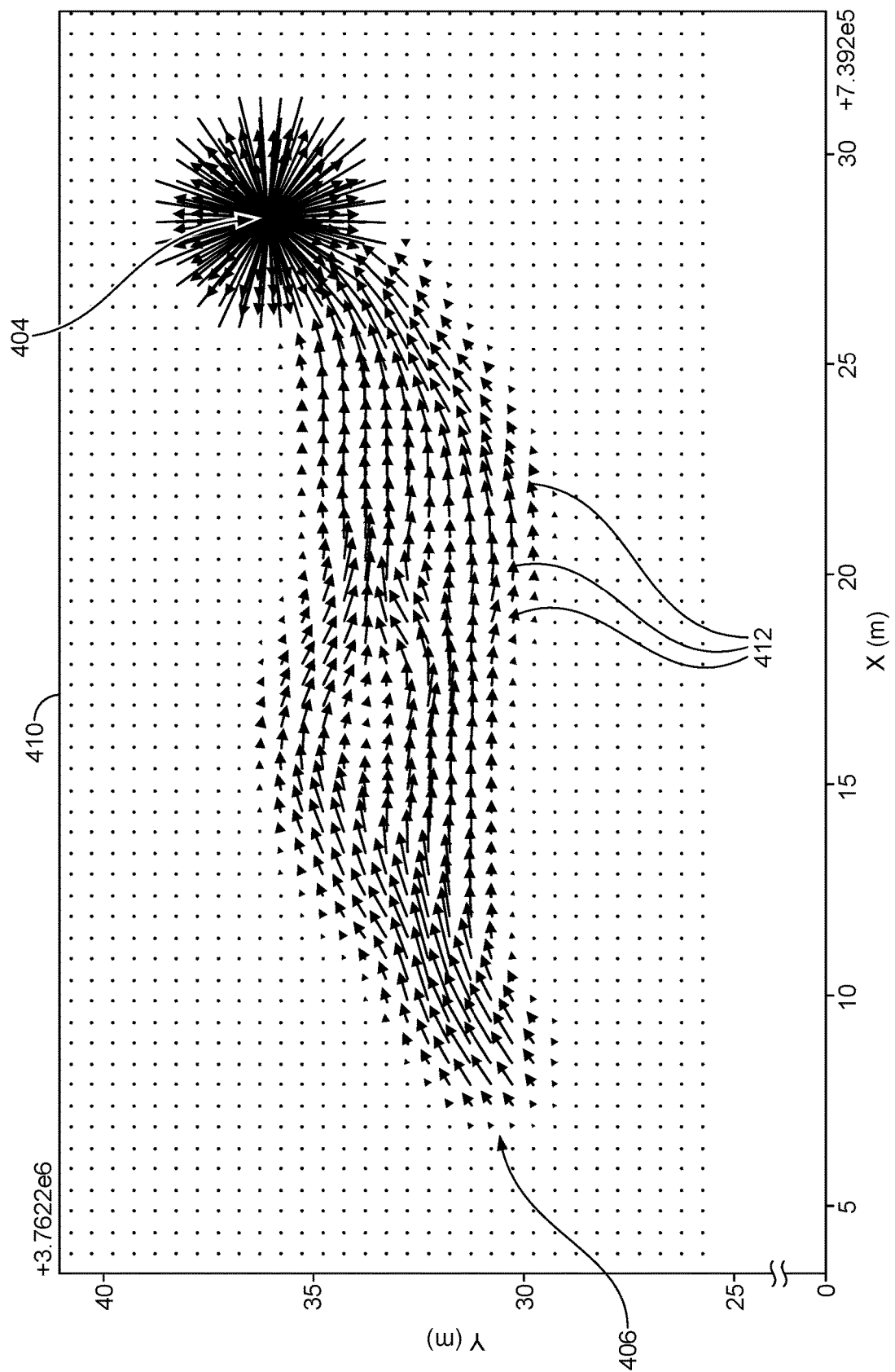
FIG. 5 depicts an example of a flow graph of directional vectors generated from historical drop-off or pick-up data associated with a second point, in accordance with aspects of the present invention.

For example, looking to the example flow graph 410 illustrated in FIG. 5, an attractive force has been mathematically applied to the second point 404, which affects the directional vectors that are generated by the inference model that has ingested the historical drop-off or pick-up data associated with the second point 404. The attractive force may be expressed as, in one example:

$$F_a = -\frac{K}{\sqrt{2\pi|\Sigma|}} \exp\left(\frac{1}{2}(x-\mu)^T \Sigma^{-1}(x-\mu)\right)$$

where K is a scaling factor for the attractive force, where $\mu=\mu_{lat}, \mu_{lon}$, of service points resulting from a clustering algorithm, and where $\Sigma$ a covariance matrix. The attractive force is superimposed on the second point. In various aspects, the attractive force is applied to at least one of the plurality of cells that is determined to correspond to the second point.

In generating the first set of data, the flow graph 410 of FIG. 5 is comprised of directional vectors 412 generated by the inference model, from historical drop-off or pick-up data associated with the second point. The directional vectors are illustrated as arrows in the flow graph 410, and are based on time series data in this example. The directional vectors/arrows visually represent the predictions made by the inference model based on the historical drop-off or pick-up data, for example, whether one triplet (e.g., concurrently captured latitude and longitude coordinates at a particular time) of time series data is predicted to be directionally connected to another point triplet in the time series data, and on, as illustrated by the directionality of the arrows "pointers." As such, each triplet or point is evaluated relative to each of its neighboring points to determine the likelihood of directionality to predict the actual route portions utilized, traversed, and captured. The length (or absence) of arrow "tails" indicates the inference model's certainty of that directionality of movement. The inference model in this example can predict this next-step trajectory for each triplet acting as a digital breadcrumb, so as to formulate the predicted directionality of the vectors shown by the arrows discussed above. The next-step trajectory prediction, in one example, may be formulated as follows:

$$x_t = x_{t-1} + f(x_{t-1}) + n_{x,t-1}$$

$$\delta x_t = f(x_{t-1}) + n_{x,t-1}$$

wherein n is a noise term (such as Gaussian noise) and $f(x_{t-1})$ is the inference model at time t-1. Through this, the inference model predicts the mean/variance of instantons velocity, in further view of the attractive force mentioned above, in such aspects.

Figure 6:
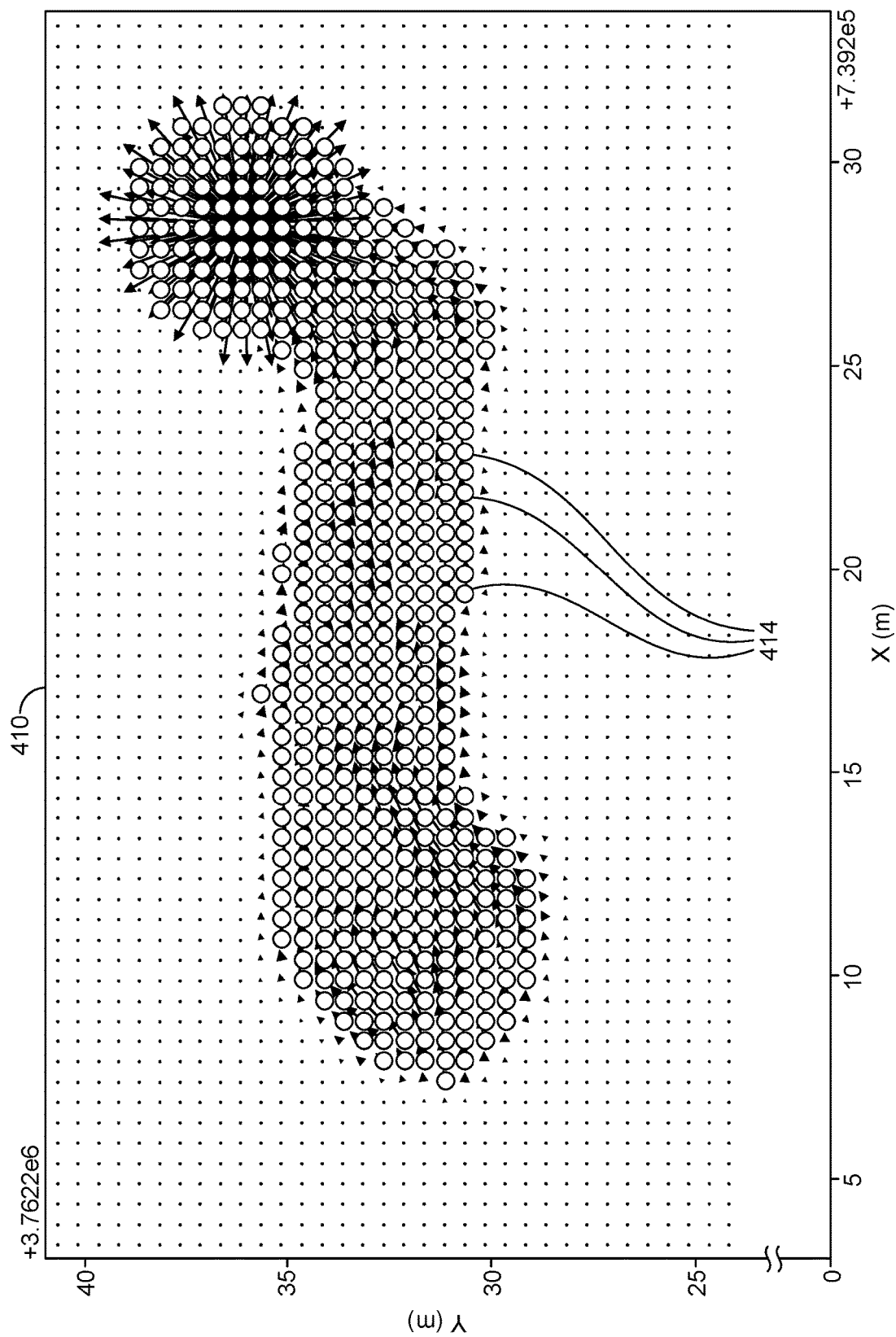
FIG. 6 depicts an example of a plurality of cells representing certainty values of and overlaying a portion of corresponding directional vectors of the flow graph, in accordance with aspects of the present invention.

Continuing, in generating the first set of data, FIG. 6 depicts an example of a plurality of cells 414 representing certainty values of corresponding directional vectors, based on the further application of an uncertainty constraint, shown as overlaying at least a portion of corresponding directional vectors of the flow graph. As such, the certainty level or "confidence" level of each of the plurality of cells is determined. The application of the uncertainly constraint is used to filter out and remove those triplets for which the inference model's certainty of the prediction is low (i.e., high uncertainty), thus leaving only those triplets and corresponding predictions having sufficient certainty remaining (e.g., the triples/predictions meeting and/or exceeding the minimum threshold of certainty defined by the uncertainly constraint/filter). For example, one or more of the plurality of cells that have high uncertainty/low confidence are removed and/or resized.

Figure 7:
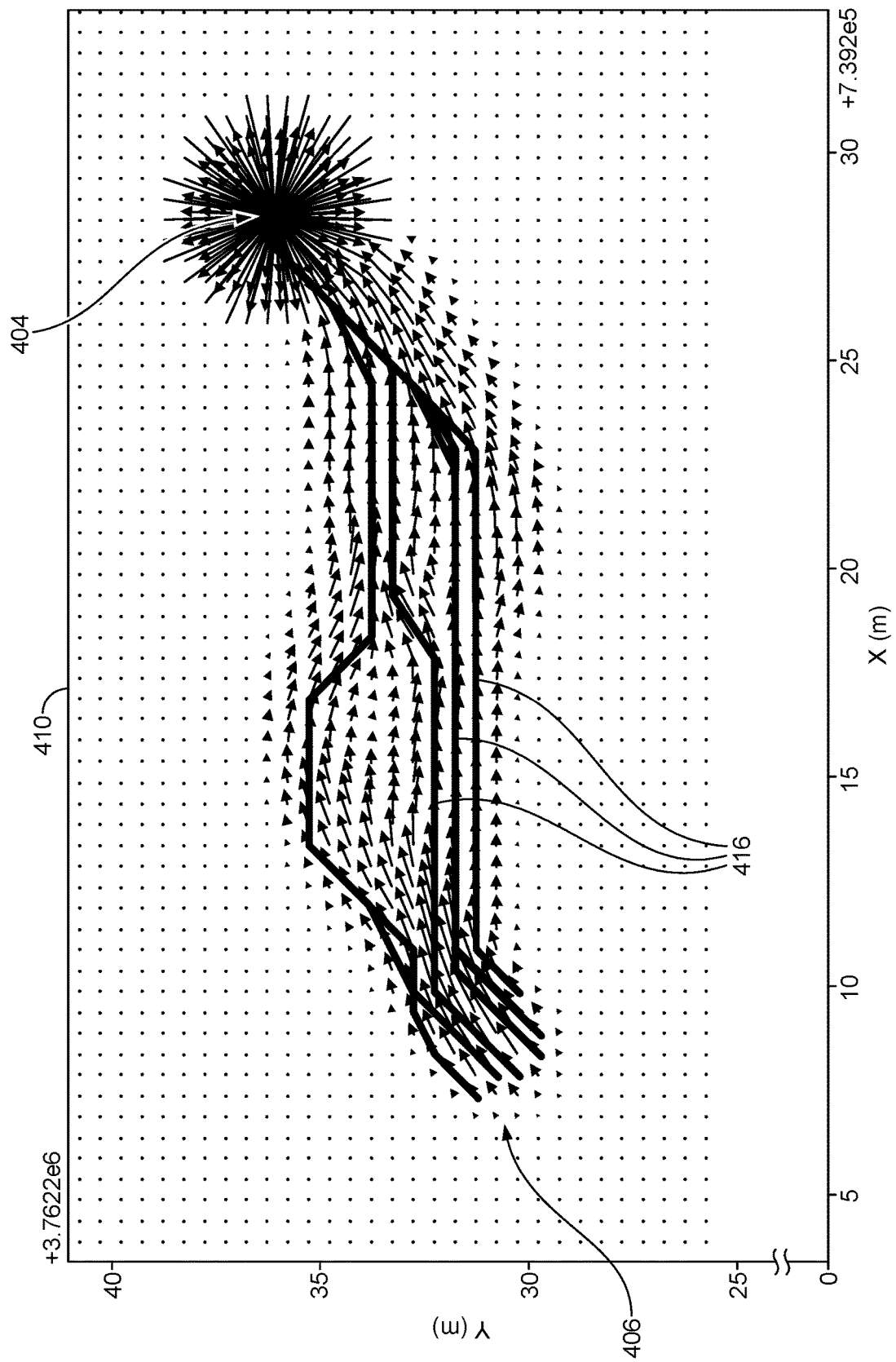
FIG. 7 depicts an example of a first plurality of route portions shown as overlaying portions of the flow graph of FIG. 5, in accordance with aspects of the present invention.

Based on the directional vectors 412 predicted by the inference model, the application of the attractive force to the second point, and the application of the uncertainty constraint to these predictions, the inference model can identify and generate the first set of data that includes a first plurality of route portions from the second point to a plurality of intermediate points. For example, FIG. 7 depicts an example of a first plurality of route portions 416 shown as overlaying portions of the flow graph of FIG. 5. The first plurality of route portions 416 are output by the inference model in the first set of data.

Turning back to the method 300, a second set of data is generated based on map data associated with the second point at block 308, wherein the second set of data includes a second plurality of route portions from the first point to the plurality of intermediate points. Although discussed in sequence here, it should be understood that the first and second sets of data can be automatically identified herein in any sequence or order, simultaneously, or concurrently.

Figure 8:
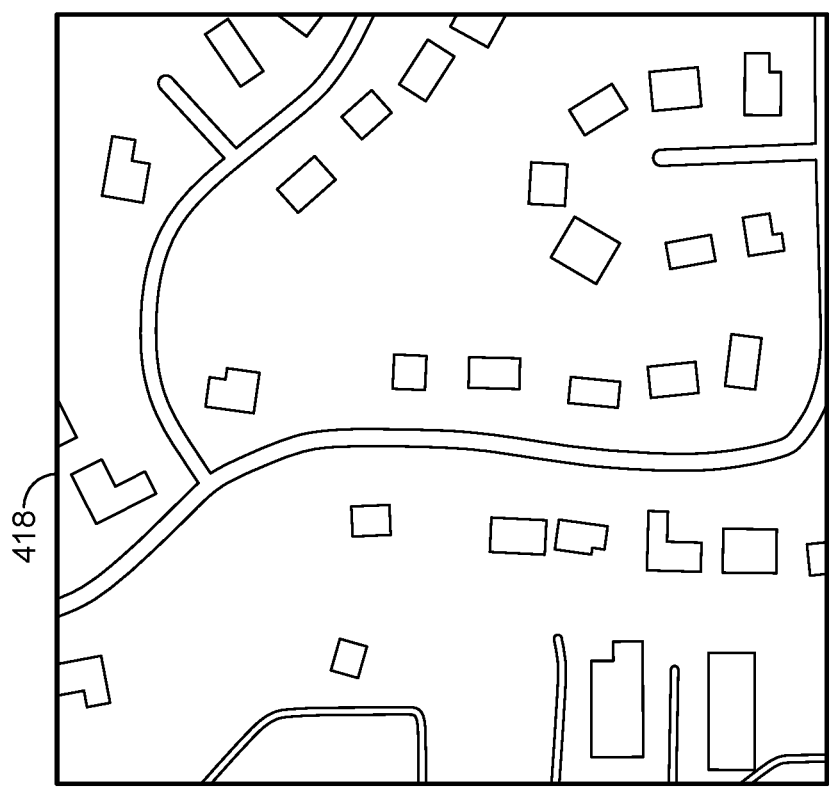
FIG. 8 depicts an example of map data, in accordance with aspects of the present invention.
Figure 9:
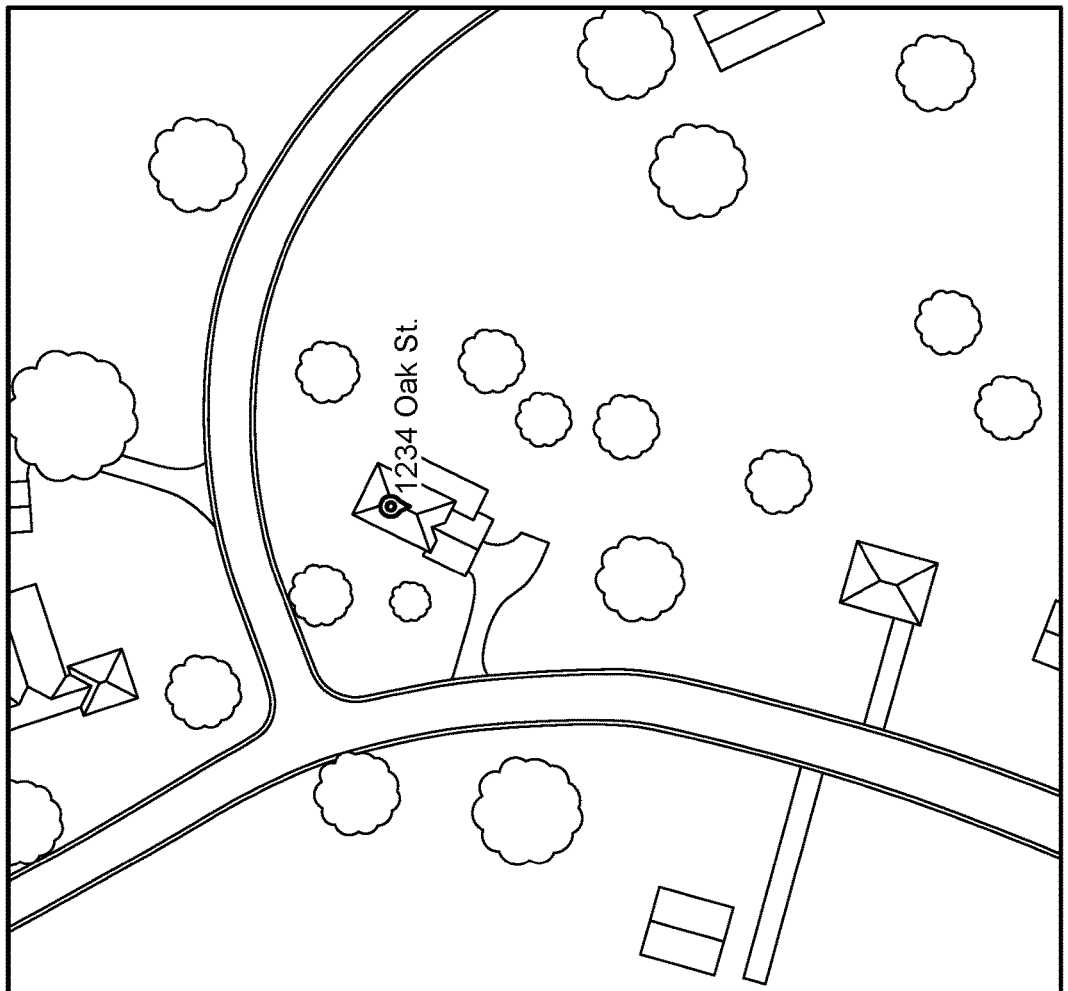
FIG. 9 depicts an example aerial view of the area of interest that corresponds to the map data, in accordance with aspects of the present invention.
Figure 10:
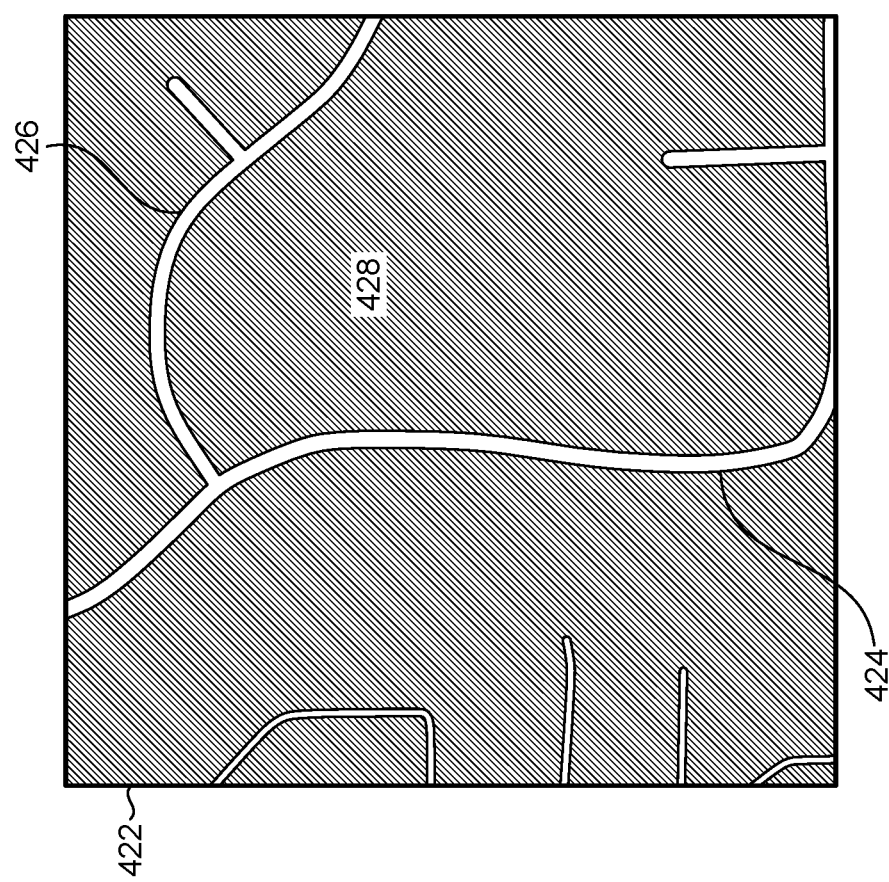
FIG. 10 depicts an example of segmented map data from the map data of FIG. 8, in accordance with aspects of the present invention.
Figure 11:
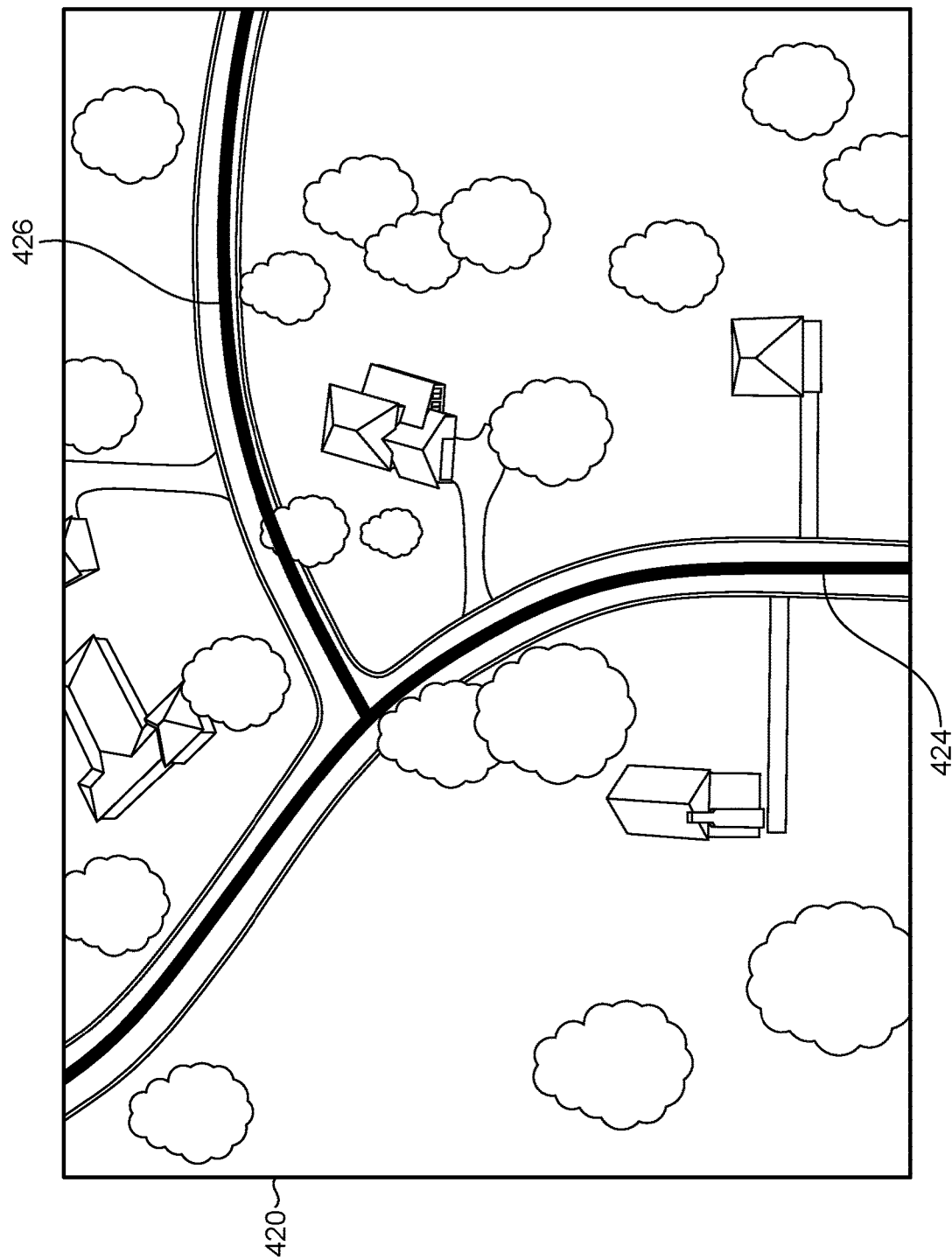
FIG. 11 depicts an example of the segmented map data of FIG. 10 overlaying portions of the aerial view of the area of interest of FIG. 9, in accordance with aspects of the present invention.

In order to generate the second set of data, a particular set of map data may be identified and retrieved as being associated with a particular delivery address to which the autonomous vehicle is to travel for delivery or pickup. In some aspects, the second set of data is generated based on the map data associated with the second point by receiving map data associated with one or more of the first point or the second point. FIG. 8 depicts an example of map data 418, in accordance with aspects of the present invention. Using the map data 418, an area of interest or a particular portion of map data may be further identified, for example, based on an address associated with a delivery or pick-up for which the autonomous vehicle is to be dispatched or is being presented dispatched. For example, FIG. 9 depicts an enlarged aerial view 420 of the area of interest in the map data 418 associated with a particular street address, in accordance with aspects of the present invention. In FIG. 9, a marker and a street address are shown overlaying the aerial view of the corresponding area of interest in the map data. In order to generate the second set of data from the map data, the map data may be segmented by analyzing, for example, the aerial image of the geographic destination in order to identify highways, roads, streets, and/or other on-street terrain. FIG. 10 depicts an example of segmented map data 422 from the map data 418 of FIG. 8, shown in this example as sidewalk map data. Through the segmentation technique, on-street terrain can be identified, shown as streets 424 and 426 and off-street areas 428. Based on the segmentation, the segmented map data can be compared to the original map data to identify and determine spatial relationship(s) between on-street terrain and the delivery address. For example, FIG. 11 depicts an example of the segmented map data of FIG. 10 overlaying portions of the aerial view of the area of interest of FIG. 9 (although the view has been slightly enlarged and tilted). In FIG. 11, the black continuous lines represent streets 424 and 426 from the segmented map data 422 of FIG. 10 and are shown as overlaying white roadways representing the aerial view of the map data (relative thickness of the black continuous lines to the roadways in the aerial data is not intended to imply any particular limitation or requirement).

Figure 12:
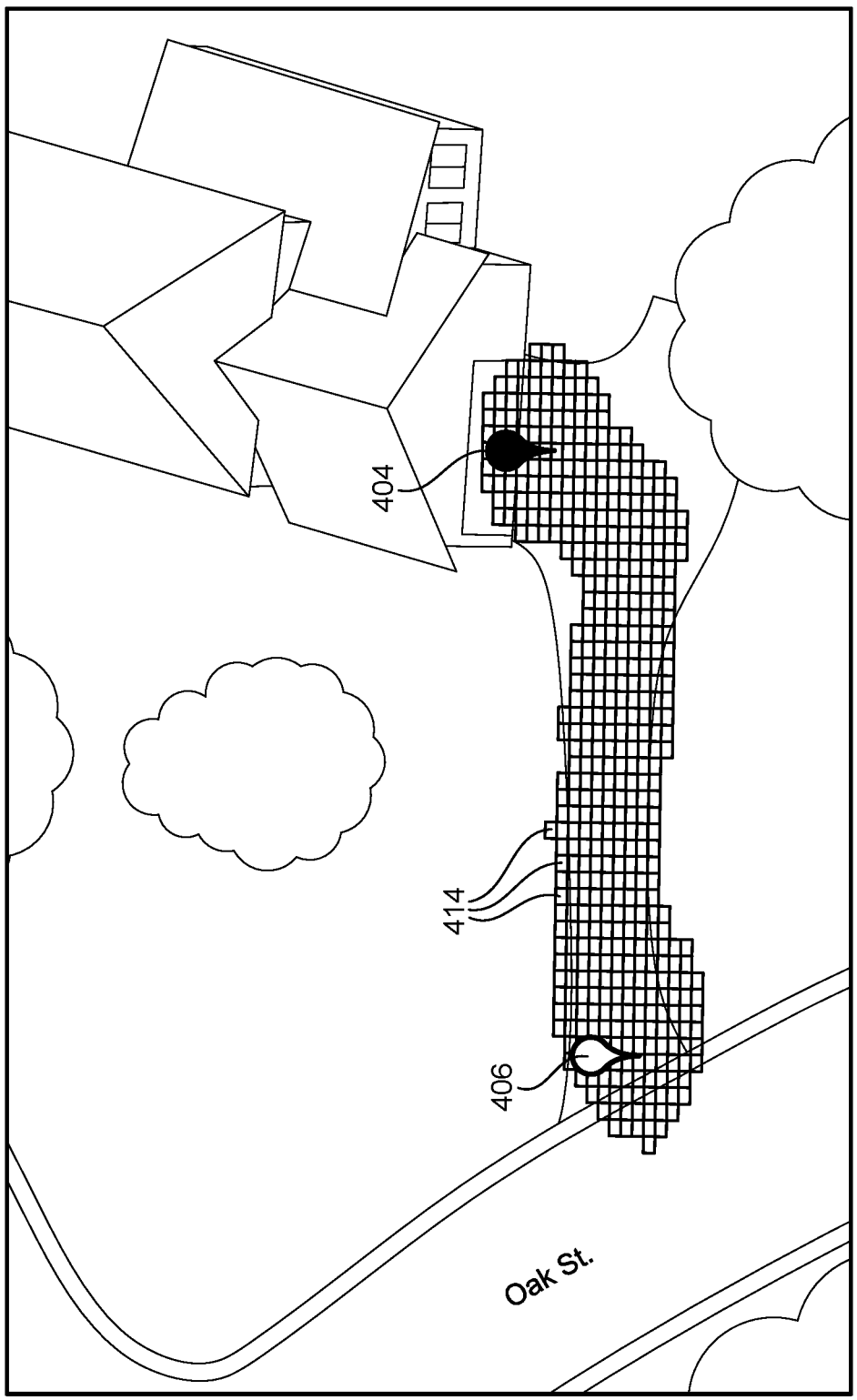
FIG. 12 depicts an example of the plurality of cells of FIG. 6 overlaying a portion of the aerial view of the area of interest of FIG. 9, in accordance with aspects of the present invention.
Figure 13:
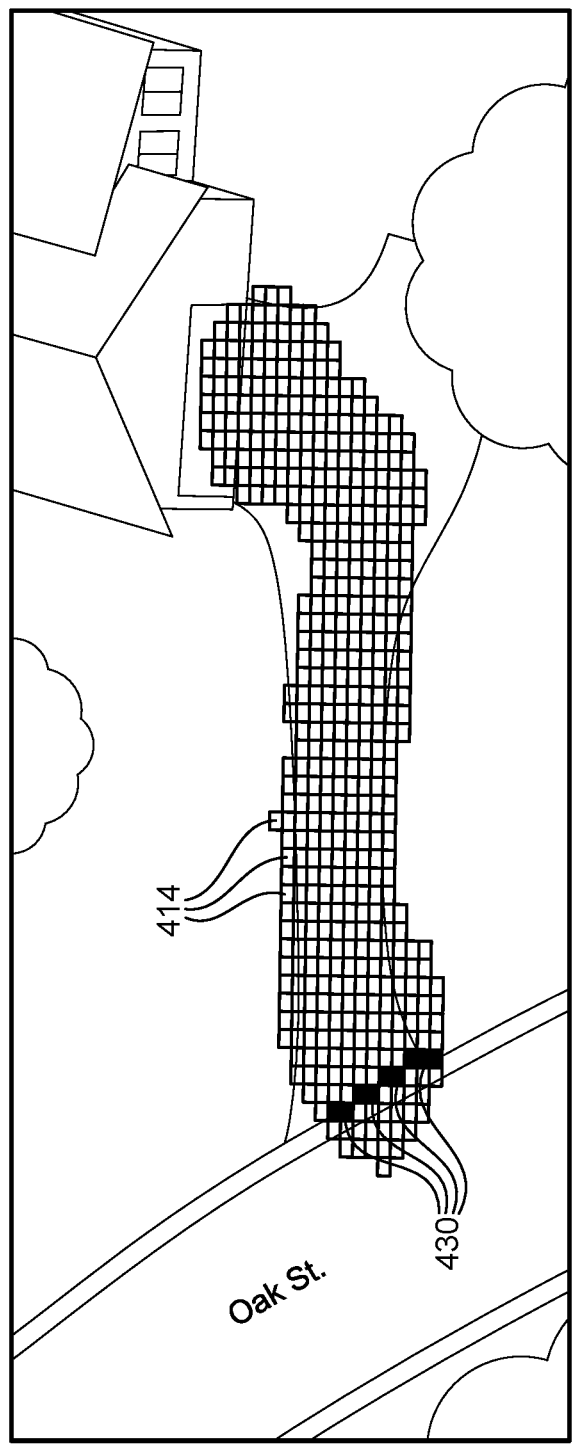
FIG. 13 depicts an example of a plurality of intermediate points that correspond to an area shared by the flow graph of FIG. 5 and the segmented map data of FIG. 11, in accordance with aspects of the present invention.
Figure 14:
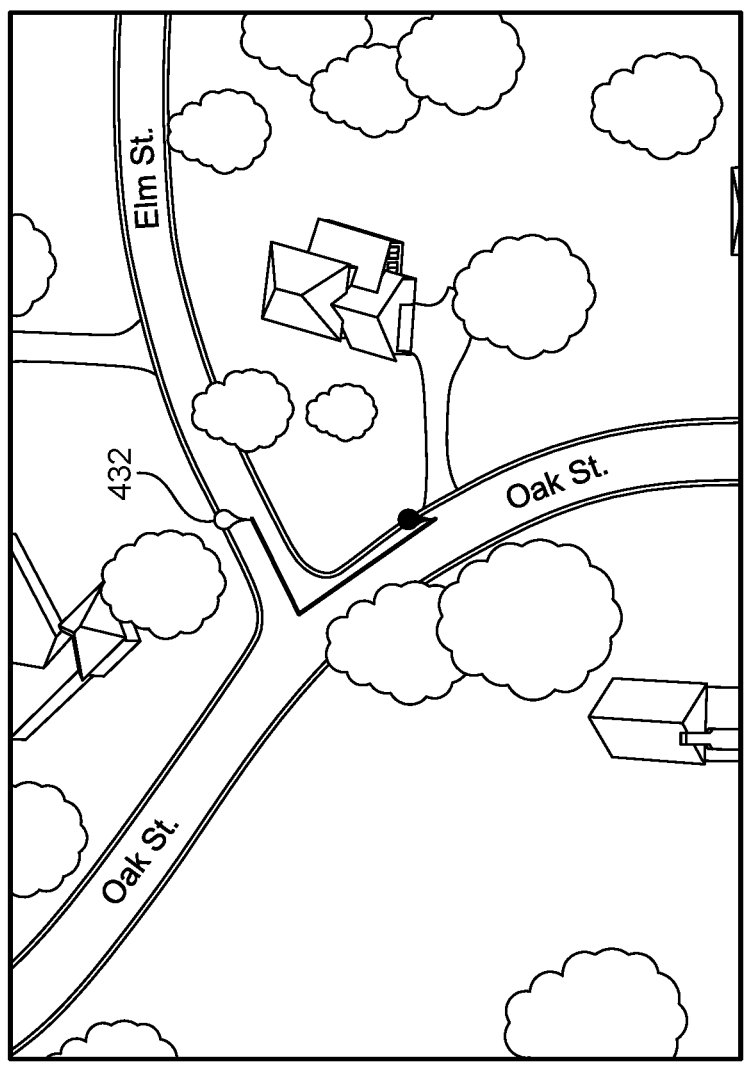
FIG. 14 depicts an example of segmented map data used for generating the second set of data, in accordance with aspects of the present invention.

Continuing, in order to identify a second plurality of route portions from the first point to a plurality of intermediate points, the segmented data and the flow graph can be directly compared to identify an area therein shared by the flow graph and the map data. FIG. 12 depicts an example of the plurality of cells of FIG. 6 overlaying a portion of the aerial view of the area of interest in the map data of FIG. 9. In FIG. 12, the second point 404 and the intermediate point 408 identified from the historical data are depicted, as well as the cells 414. Although one intermediate point is shown in this figure, it will be understood that this intermediate point 408 is just one example identified from the first set of data, as previously explained. As such, one or more intermediate points are identified based on the area shared by the flow graph, the map data, and the segmented map data. FIG. 13 depicts an example of a plurality of intermediate points 430 that correspond to an area shared by the flow graph of FIG. 5 and the segmented map data of FIG. 11. These intermediate points 430 that are identified based on the segmented map data and area shared by the flow graph and the map data, can correspond to a transitional area that corresponds to an area where on-street terrain of the map data meets, is adjacent to, and/or forms a border with off-street terrain identified via the historical data. In FIG. 14, the segmented data that corresponds to on-street terrain can be connected to the intermediate points 430 of the off-street terrain, to generate the second set of data that includes a second plurality of route portions from the first point 432 to that plurality of intermediate points.

Figure 15:
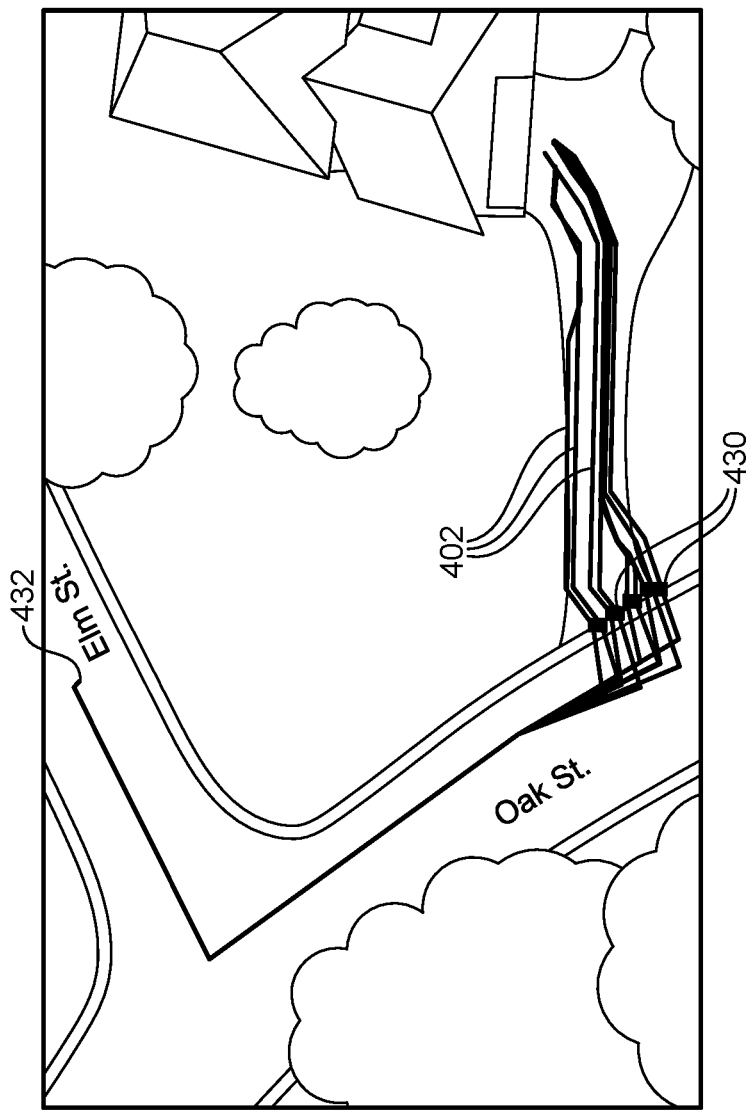
FIG. 15 depicts an example of a plurality of routes generated from combinations of a first plurality of route portions of the first set of data and a second plurality of route portions of the second set of data that intersect using the plurality of intermediate points of FIG. 13, in accordance with aspects of the present invention.

The intermediate points 430 are usable to connect the first plurality of route portions of the first set of data to the second plurality of route portions of the second set of data. As such, the segmented map data in FIG. 14 that corresponds to on-street terrain can be connected to the intermediate points 430 to form the second plurality of route portions, which are then further connected to the first plurality of route portions, as shown in FIG. 15. Thus, at block 310, a plurality of routes are generated from combinations of the first plurality of route portions of the first set of data and the second plurality of route portions of the second set of data, wherein the plurality of routes connect the first point to the second point using at least one of the plurality of intermediate points. Using the intermediate points 430 of FIG. 13, for example, one or more routes from the first point to the second point are identified, where each candidate route passes through the area shared by the flow graph and the map data, i.e., one or more of the plurality of intermediate points where on-street terrain from the map data and off-street terrain of the historical data meet, are adjacent, overlap, and/or abut one another. As such, the plurality of routes are generated to connect the first point to the second point by passing through the area shared by the flow graph and the map data, wherein the area shared by the flow graph and the map data includes to the plurality of intermediate points.

In this manner, a route portion from the first plurality is combined with another route portion from the second plurality. This process is repeated until several or all possible combinations between the various route portions in the first plurality in the first set of data that was generated from the historical data and the various route portions in the second plurality in the second set of data that was generated from the map data. In other words, route portions that traverse from the first point (e.g., the current location of the autonomous vehicle) to the intermediate point are combined with route portions that traverse the intermediate point to the second point (e.g., front door), to form a "full" route that corresponds to on-street terrain transitioning into and off-street terrain, for example corresponding to the last 10 feet of delivery. Further, the total distance of each of the plurality of routes generated from the combinations can be calculated, measured from the first point to the second point, for comparison an analysis, in some aspects.

Figure 16:
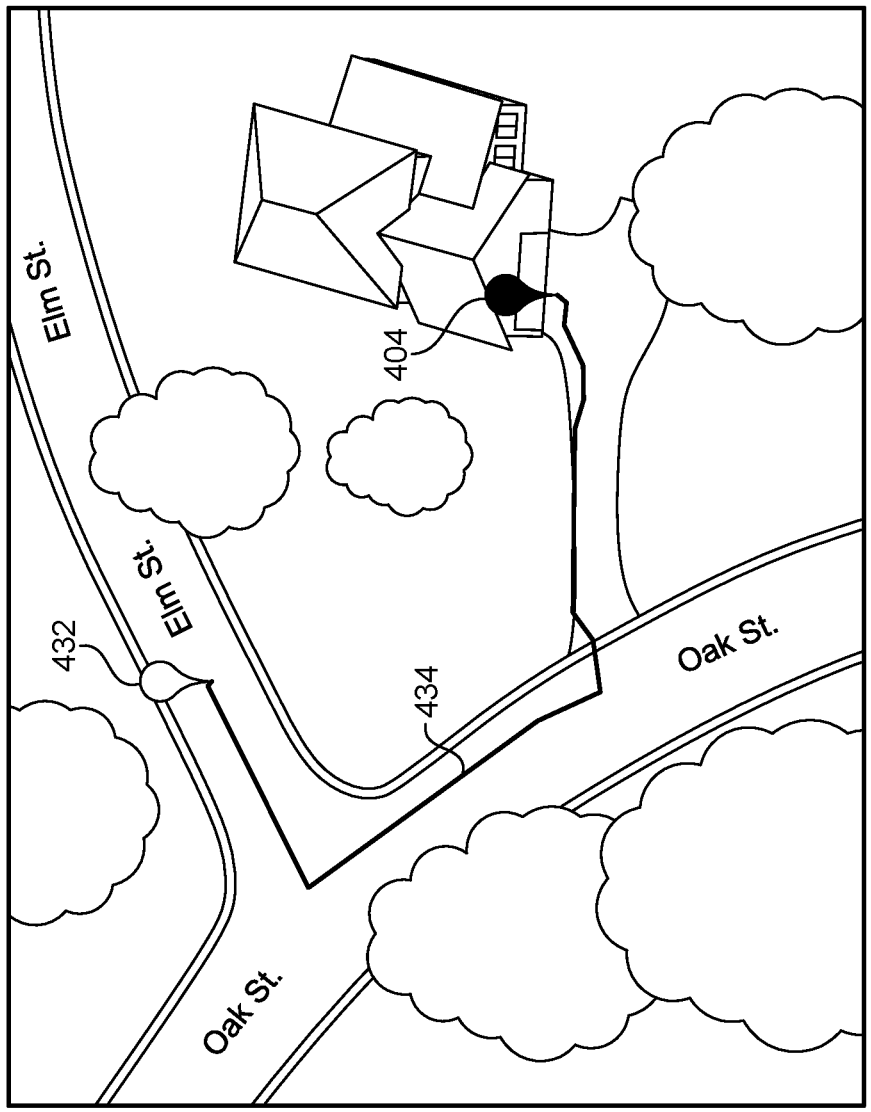
FIG. 16 depicts an example of a primary route in the plurality of routes as having a shortest distance for navigating from the first point to the second point, in accordance with aspects of the present invention.

At block 312, a primary route is selected from the plurality of routes. The primary route can be identified and selected from the plurality of routes where that primary route is selected as having a shortest length or distance for navigating from the first point to the second point, in some aspects. It should be understood that, additionally or alternatively, the primary route can be identified based on shortest time duration to traverse as opposed to shortest distance of navigation or other consideration, as the shortest distance of travel may actually require more time duration to traverse based on the terrain relative to another longer route that can be traversed faster or at higher speeds. Additionally or alternatively, the primary route can be identified based on having a middle, mean, or median length of distance to traverse among the plurality of routes, for example. As such, the primary route may be selected using one or more other considerations than distance, in some aspects, such that the shortest distance is but one example used herein. In one such aspect, the primary route includes at least one portion of the first plurality of route portions connected to at least one of the second plurality of route portions. The primary route can, for example, include a portion of a route from each of the first plurality and second plurality of route portions where those portions together, have the shortest distance relative to the other combinations that can be generated between the other remaining portions of the first and second route portions. FIG. 16 depicts an example of a primary route 434 in the plurality of routes as having a shortest distance for navigating from the first point 432 to the second point 404. Although the primary route is generally discussed herein as corresponding to the route having the shortest distance, it will be understood that other selection criteria may be utilized by the algorithm herein, such as safety of traversal.

Navigation instructions for the primary route are generated at block 314. The navigation instructions can be generated as computer-readable source code instructions that identify the first point, the second point, a particular sequence of way points that form the primary route, and that formulate computerized instructions for traversing the primary route, e.g., without requiring continuous sensor data capture and/or without requiring human intervention. The navigation instructions include traversal instructions from the fist point to the second point sing the primary route in a first direction (e.g., toward the second point) and traversal instructions from the second point to the first point in a second direction (e.g., toward the first point)—"there and back" instructions that can enable an autonomous delivery vehicle to travel from a dispatch point to a delivery point and return to the dispatch point.

At block 316, the navigation instructions are communicated to an autonomous vehicle, wherein execution of the navigation instructions cause the autonomous vehicle to travel from the first point to the second point. In aspects, the navigation instructions are computer-executable instructions that, when executed by the autonomous delivery vehicle, cause the autonomous delivery vehicle to physical travel from the first point to the second point using the primary route. In some aspects, communicating the navigation instructions may automatically cause the autonomous vehicle to execute the navigation instructions and cause the autonomous delivery vehicle to navigate from the first point to the second point using the primary route.

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 17:
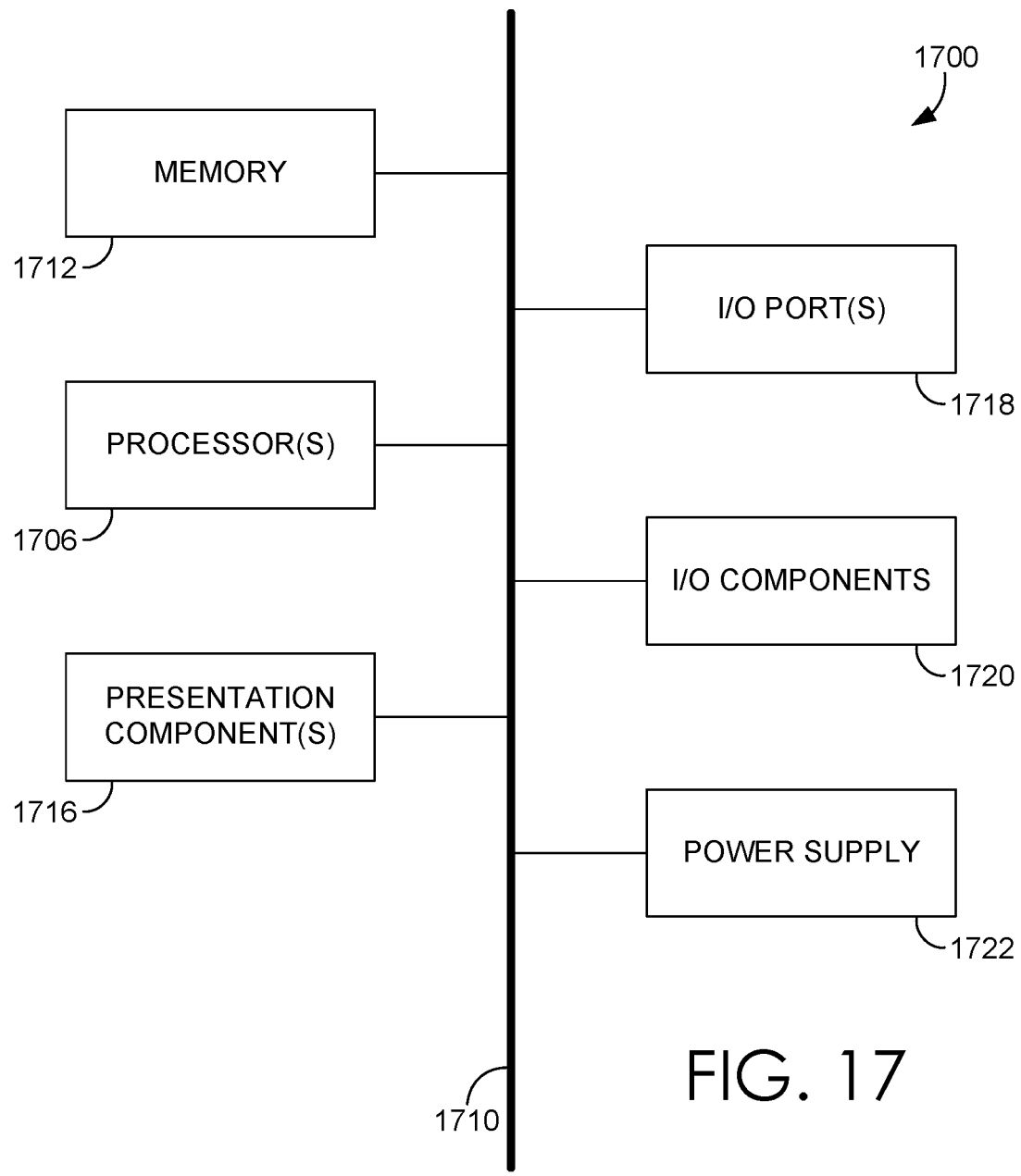
FIG. 17 is an example of a computing device, in accordance with aspects of the present invention.

Turning now to FIG. 17, it depicts an example computing device in accordance with aspects of the present invention. The computing device 1700 may be a server or backend computing device that communicated with an autonomous vehicle, in some aspects. In other aspects, the computing device 1700 may be itself, or may be incorporated into, an autonomous vehicle. The computing device 1700 is but one example of a suitable computing environment and is not intended to suggest any limitation as to the scope of use or functionality of the invention. Neither should the computing device 1700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 17, computing device 1700 includes a bus 1710 that directly or indirectly couples the following devices: memory 1712, one or more processors 1706, one or more presentation components 1716, input/output ports 1718, input/output components 1720, and a power supply 1722. Bus 1710 represents what may be one or more busses (such as an address bus, data bus, or combination thereof). Although the various blocks of FIG. 17 are shown with lines for the sake of clarity, in reality, delineating various components is not so clear, and metaphorically, the lines would more accurately be gray and fuzzy. For example, one may consider a presentation component such as a display device to be an I/O component.

Also, processors have memory. We recognize that such is the nature of the art, and reiterate that the diagram of FIG. 17 is merely illustrative of an exemplary computing device that can be used in connection with one or more embodiments of the present invention. Distinction is not made between such categories as "workstation," "server," "laptop," "mobile device, "hand-held device," etc., as all are contemplated within the scope of FIG. 17 and reference to "computing device."

Computing device 1700 typically includes a variety of computer-readable media. Computer-readable media can be any available media that can be accessed by computing device 1700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1712 includes computer storage media in the form of volatile and/or nonvolatile memory. The memory may be removable, non-removable, or a combination thereof. Exemplary hardware devices include solid-state memory, hard drives, optical-disc drives, etc. Computing device 1700 includes one or more processors that read data from various entities such as memory 1712 or I/O components 1720. Presentation component(s) 1716 present data indications to a user or other device. Exemplary presentation components include a display device, speaker, printing component, vibrating component, etc.

I/O ports 1718 allow computing device 1700 to be logically coupled to other devices including I/O components 1720, some of which may be built in. Illustrative components include a microphone, joystick, game pad, satellite dish, scanner, printer, camera, wireless device, etc.

What is claimed is:

1. One or more non-transitory computer-readable media having computer-executable instructions embodied thereon that, when executed, perform operations, comprising:
    identifying a first point that is a current location of an autonomous vehicle;
    identifying a second point that is a drop-off or pick-up location of an item;
    generating a first set of data by processing historical drop-off or pick-up data associated with the second point using an inference model to generate a flow graph comprising directional vectors representing predicted routes taken from a plurality of intermediate points to the second point, wherein the historical drop-off or pick-up data comprises time series data previously captured during performance of off-street terrain routes utilized to at least one of drop-off or pick-up at the second point, each of the plurality of intermediate points represents a beginning of at least one of the off-street terrain routes, and the first set of data includes a first plurality of route portions from the plurality of intermediate points to the second point;
    generating a second set of data based on segmenting map data to generate segmented map data that identifies on-street terrain and comparing the segmented map data to the flow graph to identify an area shared by the segmented map data and the flow graph that corresponds to the plurality of intermediate points, wherein the second set of data includes a second plurality of route portions from the first point to one or more of the plurality of intermediate points;
    generating a plurality of routes from combinations of the first plurality of route portions of the first set of data and the second plurality of route portions of the second set of data, wherein each of the plurality of routes connects the first point to the second point using at least one of the plurality of intermediate points;
    selecting, based at least in part on selection criteria, a primary route from the plurality of routes;
    generating navigation instructions for the primary route; and
    communicating the navigation instructions to the autonomous vehicle to cause the autonomous vehicle to execute the navigation instructions and travel from the first point to the second point.

2. The one or more media of claim 1, wherein map data is associated with at least one of the first point or the second point.

3. The one or more media of claim 1, wherein the selection criteria comprise identifying a route in the plurality of routes having a shortest distance for navigating from the first point to the second point.

4. The one or more media of claim 1, wherein the inference model mathematically applies an attractive force to the second point to affect flow of the directional vectors.

5. The one or more media of claim 1, wherein the inference model applies an uncertainly constraint to the time series data to remove data used in generating one or more of the plurality of routes having a certainty that does not satisfy a threshold.

6. The one or more media of claim 1, wherein the inference model is a two-dimensional Gaussian model.

7. The one or more media of claim 1, wherein the selection criteria comprise identifying a route from the plurality of routes having a shortest time duration to traverse from the first point to the second point.

8. The one or more media of claim 1, wherein the selection criteria comprise identifying a route from the plurality of routes having at least one of a medium length of distance or a mean length of distance to traverse among lengths of distance to traverse for the plurality of routes.

9. A system comprising:
    a cloud-based platform having a machine-learning Gaussian data model and a route generator;
    wherein the cloud-based platform:

identifies a first point that is a current location of an autonomous vehicle; and identifies a second point that is a drop-off or pick-up location of an item;

wherein the machine-learning Gaussian data model:

generates a first set of data based on historical drop-off or pick-up data associated with the second point using the machine-learning Gaussian data model to generate a flow graph comprising directional vectors representing predicted routes taken from a plurality of intermediate points to the second point, wherein the historical drop-off or pick-up data comprises time series data previously captured during performance of off-street terrain routes utilized to at least one of drop-off or pick-up at the second point, each of the plurality of intermediate points represents a beginning of at least one of the off-street terrain routes, and the first set of data includes a first plurality of route portions from the plurality of intermediate points to the second point;

wherein the route generator:

generates a second set of data based on segmenting map data to generate segmented map data that identifies on-street terrain and comparing the segmented map data to the flow graph to identify an area shared by the segmented map data and the flow graph that corresponds to the plurality of intermediate points, wherein the second set of data includes a second plurality of route portions from the first point to at least a portion of the plurality of intermediate points;

generates a plurality of routes from combinations of the first plurality of route portions of the first set of data and the second plurality of route portions of the second set of data, wherein each of the plurality of routes connects the first point to the second point using at least one of the plurality of intermediate points; and selects, based at least in part on selection criteria, a primary route from the plurality of routes; and wherein the cloud-based platform:

generates navigation instructions for the primary route; and communicates the navigation instructions to the autonomous vehicle, to cause the autonomous vehicle to execute the navigation instructions and travel from the first point to the second point.

10. The system of claim 9, wherein the selection criteria comprise identifying a route from the plurality of routes having a shortest distance for navigating from the first point to the second point.

11. The system of claim 9, wherein the selection criteria comprise identifying a route from the plurality of routes having a shortest time duration to traverse from the first point to the second point.

12. The system of claim 9, wherein the selection criteria comprise identifying a route from the plurality of routes having at least one of a medium length of distance or a mean length of distance to traverse among lengths of distance to traverse for the plurality of routes.

13. The system of claim 9, wherein the machine-learning Gaussian data model generates the first set of data by identifying an attractive force from the historical drop-off or pick-up data via clustering and applying the attractive force to the second point to affect the directional vectors.

14. A method comprising:

identifying a first point that is a current location of an autonomous vehicle;

identifying a second point that is a drop-off or pick-up location of an item;

querying, by a computing device and based at least in part on the second point, historical drop-off or pick-up data, wherein the historical drop-off or pick-up data comprises time series data previously captured involving performance of off-street terrain routes utilized to at least one of drop-off or pick-up of items at the second point;

processing, by the computing device, the historical drop-off or pick-up data using an inference model to generate a first set of data comprising a first plurality of route portions from a plurality of intermediate points to the second point, wherein the inference model generates the first set of data by generating a flow graph of directional vectors representing predicted routes taken from the plurality of intermediate points to the second point, and each of the plurality of intermediate points represents a beginning of at least one of the off-street terrain routes;

querying, by the computing device and based at least in part on at least one of the first point or the second point, map data;

generating, by the computing device analyzing the map data, segmented map data, wherein the segmented map data corresponds to on-street terrain;

generating, by the computing device, a second set of data comprising a second plurality of route portions from the first point to at least a portion of the plurality of intermediate points by comparing the segmented map data to the flow graph to identify an area shared by both the segmented map data and the flow graph;

generating, by the computing device and from the first set of data and the second set of data, a plurality of routes from combinations of the first plurality of route portions and the second plurality of route portions, wherein each route of the plurality of routes connects the first point to the second point using at least one of the plurality of intermediate points;

selecting, by the computing device and based at least in part on selection criteria, a primary route from the plurality of routes;

generating, by the computing device, navigation instructions for the primary route; and communicating, by the computing device, the navigation instructions to the autonomous vehicle to cause the autonomous vehicle to execute the navigation instructions and travel from the first point to the second point.

15. The method of claim 14, wherein the time series data comprises a plurality of data point triplets in which each data point triplet comprises a latitude coordinate, a longitude coordinate, and a time.

16. The method of claim 14, wherein the inference model generates the first set of data by identifying an attractive force from the historical drop-off or pick-up data via clustering and applying the attractive force to the second point to affect the directional vectors.

17. The method of claim 14, wherein the inference model generates the first set of data by applying an uncertainty constraint to the time series data to filter out data from the time series data used in generating one or more of the plurality of routes having a certainty that does not satisfy a threshold.

18. The method of claim 14, wherein the selection criteria comprise identifying a route from the plurality of routes having a shortest distance for navigating from the first point to the second point.

19. The method of claim 14, wherein the selection criteria comprise identifying a route from the plurality of routes having a shortest time duration to traverse from the first point to the second point.

20. The method of claim 14, wherein the selection criteria comprise identifying a route from the plurality of routes having at least one of a medium length of distance or a mean length of distance to traverse among lengths of distance to traverse for the plurality of routes.

* * * * *